US012314885B2

United States Patent
Adelson et al.

(10) Patent No.: US 12,314,885 B2
(45) Date of Patent: May 27, 2025

(54) METHOD AND SYSTEM FOR PERSONNEL EVALUATION

(71) Applicant: THE WINDESSA GROUP, Hoboken, NJ (US)

(72) Inventors: Alex Adelson, Hoboken, NJ (US); Nick Mackres, Bayville, NJ (US); Diego Sanchez, Ft. Lauderdale, FL (US)

(*) Notice: Subject to any disclaimer, the term of this patent is extended or adjusted under 35 U.S.C. 154(b) by 0 days.

(21) Appl. No.: 18/690,736

(22) PCT Filed: Sep. 12, 2022

(86) PCT No.: PCT/US2022/043239
§ 371 (c)(1),
(2) Date: Mar. 10, 2024

(87) PCT Pub. No.: WO2023/039256
PCT Pub. Date: Mar. 16, 2023

(65) Prior Publication Data
US 2024/0403795 A1  Dec. 5, 2024

Related U.S. Application Data

(60) Provisional application No. 63/243,348, filed on Sep. 13, 2021.

(51) Int. Cl.
G06Q 10/0639 (2023.01)
(52) U.S. Cl.
CPC .............. *G06Q 10/06398* (2013.01)
(58) Field of Classification Search
CPC ............................................. G06Q 10/06398
(Continued)

(56) References Cited

U.S. PATENT DOCUMENTS

2003/0115094 A1* 6/2003 Ammerman ..... G06Q 10/06393
702/182
2012/0221378 A1   8/2012 Thell
(Continued)

OTHER PUBLICATIONS

"Excellence in IT Consulting: Integrating Multiple Stakeholders' Perceptions of Top Performers" to Joshi et al., Oct. 20, 2010 (Year: 2010).*

*Primary Examiner* — Po Han Lee
(74) *Attorney, Agent, or Firm* — Nexus Law PLLC; Leonard Raykinsteen

(57) ABSTRACT

A system and method is disclosed for evaluating and ranking personnel within an organization for performance and value. The organization includes a plurality of hierarchy levels based on the management structure of the organization and a plurality of workgroups. Each workgroup includes an evaluator and a plurality of evaluatees. An attribute data set comprising subjective scores for each evaluates for a plurality of attributes is created for each workgroup. An evaluator curve is calculated from the attribute data set for each evaluator which accounts for each evaluators inclinations and style. A hierarchy behavior curve is calculated from each evaluator curve in each hierarchy level which accounts for the inclinations and style of each hierarchy level. The attribute data set, evaluator curve data, hierarchy behavior curve data, adjustment modulus, raw scores, and/or adjusted scores may be recorded and stored on a computer readable medium for use with a computer.

16 Claims, 21 Drawing Sheets

(58) Field of Classification Search
USPC .......................................................... 705/7.42
See application file for complete search history.

(56) References Cited

U.S. PATENT DOCUMENTS

| | | |
|---|---|---|
| 2014/0108079 A1 | 4/2014 | Wright et al. |
| 2015/0269512 A1 | 9/2015 | Wartel |
| 2016/0275431 A1* | 9/2016 | Gouvernel ....... G06Q 10/06393 |
| 2018/0075416 A1 | 3/2018 | Polli et al. |
| 2019/0050782 A1* | 2/2019 | Hahn ..................... G06Q 50/01 |

* cited by examiner

|  | ATTRIBUTES -RAW DATA | | | | | | | | | |
|---|---|---|---|---|---|---|---|---|---|---|
|  | J/E | P/I | L/D | S/AM | T/S | E/H | T | C/E | TOTAL | DRIFT |
| 1 | 5 | 4 | 5 | 6 | 2 | 5 | 6 | 2 | 35 | 2 |
| 2 | 5 | 4 | 6 | 3 | 4 | 5 | 6 | 4 | 37 | 1 |
| 3 | 5 | 3 | 6 | 4 | 6 | 6 | 5 | 3 | 28 | 1 |
| 4 | 6 | 5 | 6 | 4 | 3 | 6 | 7 | 5 | 42 | 1 |
| 5 | 5 | 5 | 4 | 5 | 6 | 5 | 5 | 5 | 40 | 1 |
| 6 | 5 | 5 | 5 | 2 | 3 | 5 | 5 | 4 | 34 | 2 |
| 7 | 3 | 5 | 3 | 5 | 3 | 4 | 5 | 5 | 33 | 4 |
| 8 | 3 | 4 | 4 | 6 | 5 | 4 | 4 | 2 | 32 | 1 |

(EVALUATEES)

FIG. 1

|  | ATTRIBUTES -RAW DATA | | | | | | | | | |
|---|---|---|---|---|---|---|---|---|---|---|
|  | J/E | P/I | L/D | S/AM | T/S | E/H | T | C/E | TOTAL | DRIFT |
| 1 | 5 | 4 | 5 | 6 | 2 | 5 | 6 | 2 | 35 | 2 |
| 2 | 5 | 4 | 6 | 3 | 4 | 5 | 6 | 4 | 37 | 1 |
| 3 | 5 | 3 | 6 | 4 | 6 | 6 | 5 | 3 | 28 | 1 |
| 4 | 6 | 5 | 6 | 4 | 3 | 6 | 7 | 5 | 42 | 1 |
| 5 | 5 | 5 | 4 | 5 | 6 | 5 | 5 | 5 | 40 | 1 |
| 6 | 5 | 5 | 5 | 2 | 3 | 5 | 5 | 4 | 34 | 2 |
| 7 | 3 | 5 | 3 | 5 | 3 | 4 | 5 | 5 | 33 | 4 |
| 8 | 3 | 4 | 4 | 6 | 5 | 4 | 4 | 2 | 32 | 1 |

(EVALUATEES)

FIG. 2

| attributes | | adverse | borderline | mediocre | average | good | excellent | exceptional | SCORE TOTALS |
|---|---|---|---|---|---|---|---|---|---|
| performance | Job Execution | 1 | 2 | 3 | 4 | 5 | 6 | 7 | X |
| | Leadership/ Decisionship | 1 | 2 | 3 | 4 | 5 | 6 | 7 | X |
| | Proficiency/ Initiative | 1 | 2 | 3 | 4 | 5 | 6 | 7 | X |
| | Stress/ Anger Management | 1 | 2 | 3 | 4 | 5 | 6 | 7 | X |
| | Team Skills | 1 | 2 | 3 | 4 | 5 | 6 | 7 | X |
| values | Ethics/ Intellectual Honesty | 1 | 2 | 3 | 4 | 5 | 6 | 7 | X |
| | Tenacity/Consistency | 1 | 2 | 3 | 4 | 5 | 6 | 7 | X |
| | Continuing Education | 1 | 2 | 3 | 4 | 5 | 6 | 7 | X |
| | | | | | | | raw score total | | XX |
| job assignment drift: none ☐  minimal ☐  moderate ☐  extreme ☐ | | | | | | | adjusted score total | | XX.X |

FIG. 17

| attributes | | adverse | borderline | mediocre | average | good | excellent | exceptional | SCORE TOTALS |
|---|---|---|---|---|---|---|---|---|---|
| performance | Job Execution | 1 | 2 | 3 | 4 | 5 | 6 | 7 | 6 |
| | Leadership/ Decisionship | 1 | 2 | 3 | 4 | 5 | 6 | 7 | 5 |
| | Proficiency/ Initiative | 1 | 2 | 3 | 4 | 5 | 6 | 7 | 6 |
| | Stress/ Anger Management | 1 | 2 | 3 | 4 | 5 | 6 | 7 | 2 |
| | Team Skills | 1 | 2 | 3 | 4 | 5 | 6 | 7 | 3 |
| values | Ethics/ Intellectual Honesty | 1 | 2 | 3 | 4 | 5 | 6 | 7 | 6 |
| | Tenacity/Consistency | 1 | 2 | 3 | 4 | 5 | 6 | 7 | 6 |
| | Continuing Education | 1 | 2 | 3 | 4 | 5 | 6 | 7 | 5 |
| | | | | | | | raw score total | | 39 |
| job assignment drift: none ☐  minimal ■  moderate ☐  extreme ☐ | | | | | | | Adjusted score total | | 37.1 |

FIG. 18

| Performance and Value Attributes | |
|---|---|
| Exceptional | 7 |
| Excellent | 6 |
| Good | 5 |
| Average | 4 |
| Mediocre | 3 |
| Borderline | 2 |
| Adverse | 1 |
| Job Assignment Drift | |
| None | 1 |
| Minimal | 2 |
| Moderate | 3 |
| Extreme | 4 |

FIG. 19

| | attributes | adverse | borderline | mediocre | average | good | excellent | exceptional | SCORE TOTALS |
|---|---|---|---|---|---|---|---|---|---|
| performance | Job Execution | 1 | 2 | 3 | 4 | 5 | 6 | 7 | 6 |
| | Leadership/Decisionship | 1 | 2 | 3 | 4 | 5 | 6 | 7 | 5 |
| | Proficiency/Initiative | 1 | 2 | 3 | 4 | 5 | 6 | 7 | 6 |
| | Stress/Anger Management | 1 | 2 | 3 | 4 | 5 | 6 | 7 | 2 |
| | Team Skills | 1 | 2 | 3 | 4 | 5 | 6 | 7 | 3 |
| values | Ethics/Intellectual Honesty | 1 | 2 | 3 | 4 | 5 | 6 | 7 | 6 |
| | Tenacity/Consistency | 1 | 2 | 3 | 4 | 5 | 6 | 7 | 6 |
| | Continuing Education | 1 | 2 | 3 | 4 | 5 | 6 | 7 | 5 |

| | | |
|---|---|---|
| job assignment drift: none ☐ minimal ■ moderate ☐ extreme ☐ | raw score total | 39 |
| | Adjusted score total | 37.1 |

FIG. 20

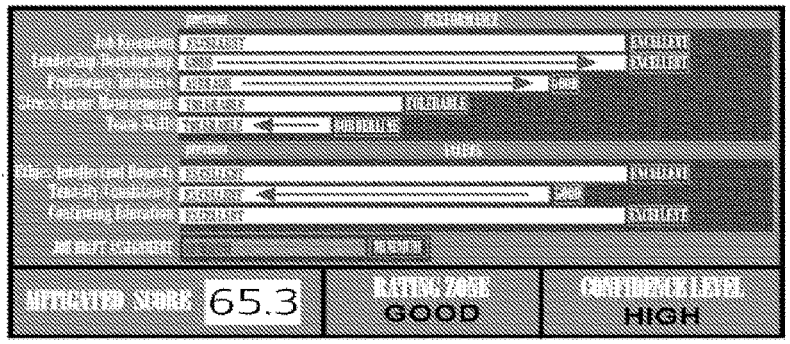
FIG. 31
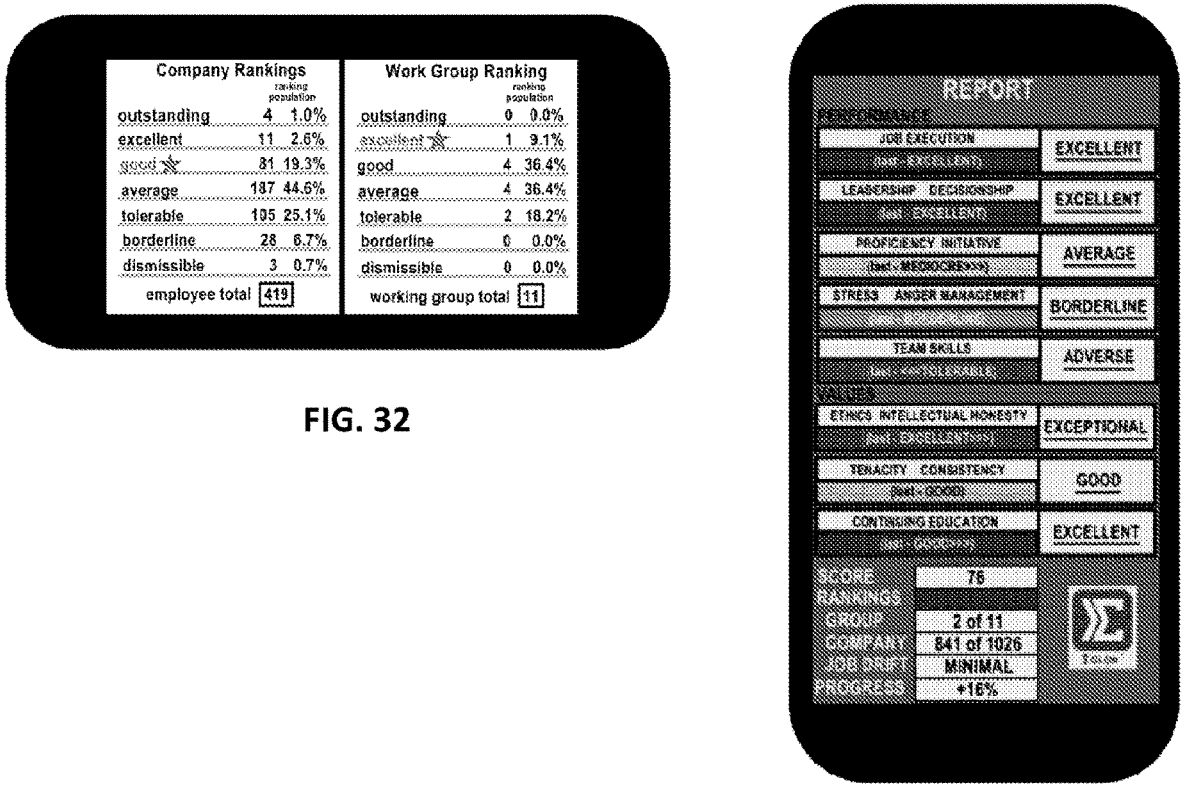
FIG. 32
FIG. 33

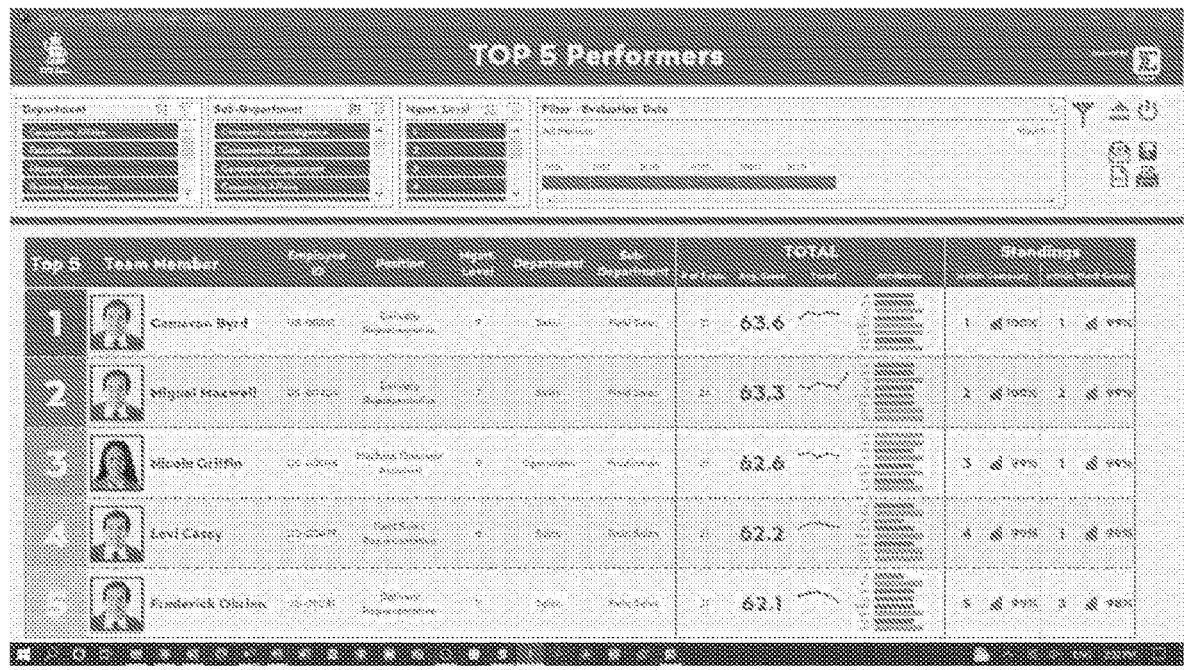
FIG. 38
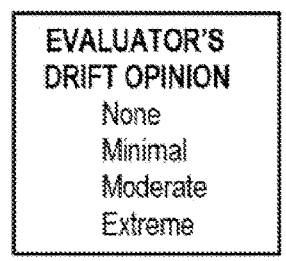
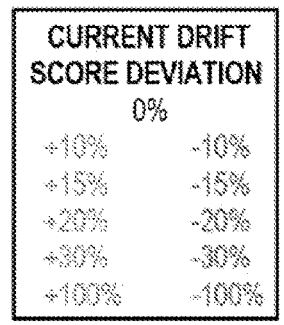
FIG. 39

METHOD AND SYSTEM FOR PERSONNEL EVALUATION

CROSS REFERENCE TO RELATED APPLICATIONS

The present application claims the priority benefits of International Patent Application No. PCT/US2022/043239, filed on Sep. 12, 2022, and claims benefit of U.S. Provisional Application No. 63/243,348 filed on Sep. 13, 2021, which are hereby incorporated herein by reference in their entireties.

BACKGROUND OF THE INVENTION

Field of the Invention

The present invention relates to a method of and a system for evaluating and ranking personnel for their performance and values as employees, consultants, military personnel, educational faculty, and students. More specifically, the present invention relates to a method and system for evaluating and ranking personnel that accounts for evaluator biases.

Description of the Related Art

Personnel evaluation is a standard process used throughout business organizations, the military, educational institutions, medical establishments, and other types of organizations, both for-profit and non-profit. Traditional evaluation methods require non-productive manager time at the high cost of staff overhead hours. Further, there is the mental anguish of manager evaluation responsibility, a constant source of procrastination. The existing methodologies never evaluate the individual doing the evaluation. The invention alone measures the Evaluator performing the evaluation process and applies an adjustment factor that mitigates the effects of an Evaluator's biases and judgment style on the outcome score. Biases are unfair and distorting, and judgment styles can vary from hard to easy. The need for a personnel evaluation system that mitigates the effects of both and includes the impact of other significant factors that interfere with evaluation integrity is essential. These also include organization standards, culture, financial state, and the ubiquitous external and internal forces such as the economy and politics.

In the age of Agile management techniques and similar protocols, human performance evaluation has remained stagnant, and for the most part, non-innovational. The business media has reported the many failures of the present systems. The most common complaints have been the ineffectiveness of the reports and the cost of overhead manager evaluation time. The many systems that are in existence do not take into account the following:
1. Evaluating the individual performing the evaluation—all evaluators are different.
2. All organizations are different, and their sub-organizations are different.
3. All organizations change continually, both from internal as well as external forces.
4. All personnel in an organization are interdependent; therefore, the evaluation process must involve that veracity.

The sum of these realities is that personal evaluation is non-linear and dynamic. The existing systems tend to be linear and rules-based, disregarding change and focusing only on the individual as an independent entity. Consequently, the standards of a given organization's performance and values are never determined, therefore, not part of the process. The evaluation penalty is scoring inequivalence.

Accordingly, there is a need for a system and method for evaluating and ranking personnel that take these factors into consideration, providing a more reliable evaluation.

SUMMARY OF THE INVENTION

It is therefore an object of the present invention to provide a personnel evaluation system based on regression analytics, linear algebra, curve matching, and matrix technology. The entire system is built on the fundamentals of digital field theory. The methodology can detect an evaluator's judgment style, bias(es), performance and value standards, and the ubiquitous influence of internal and external forces such as the economy.

According to one presently preferred embodiment of the invention, there is provided a method for evaluating and ranking personnel within an organization for performance and value, wherein the organization includes a plurality of hierarchy levels and a plurality of workgroups. Each workgroup is associated with one of the plurality of hierarchy levels and consists of an evaluator and a plurality of evaluatees.

The method comprises a number of steps. First, an attribute data set is created for each workgroup. The attribute data set comprises subjective scores for each evaluatee for a plurality of attributes. The scores are determined and assigned by the evaluator for that workgroup. Next, a raw score for each individual evaluatee is calculated from the attribute data set. The raw score consists of the sum of the scores for each of the plurality of attributes for that evaluatee. Next, an evaluator curve is calculated from the attribute data set for each evaluator which accounts for each evaluator's inclinations and style. A plurality of hierarchy levels is assigned to the organization based on the management structure of the organization, with each workgroup being assigned to one hierarchy level. A hierarchy behavior curve is calculated from each evaluator curve in each hierarchy level for that hierarchy level which accounts for the inclinations and style of each hierarchy level. The hierarchy behavior curve is then adjusted for each hierarchy level by averaging the hierarchy behavior curve for a selected level with all other higher hierarchy levels. Next, an adjustment modulus is calculated for each evaluator by averaging the evaluator curve for that evaluator with the hierarchy behavior curve for the hierarchy level to which the evaluator is assigned. The adjustment modulus is applied to the raw score for each evaluatee to arrive at an adjusted score for each evaluatee that mitigates the effects of bias, style, corporate culture, and other internal and external forces. The attribute data set, evaluator curve data, hierarchy behavior curve data, adjustment modulus, raw scores, and/or adjusted scores may be recorded and stored on a computer-readable medium for use with a computer, tablet, and/or smartphone.

The plurality of attributes may comprise a plurality of performance attributes and a plurality of value attributes. The plurality of performance attributes may include task (job) execution; proficiency/initiative; leadership/decisionship; stress/anger management; and team skills. The plurality of value attributes may include ethics/intellectual honesty; tenacity; and continuing education. Each of the plurality of performance attributes and value attributes is weighed symmetrically or asymmetrically.

The step of calculating from said attribute data set an evaluator curve for each evaluator which accounts for each evaluator's inclinations and style further comprises, for each evaluator, may further include the steps of computing a mean score from the raw scores for each attribute selected by the evaluator for the plurality of evaluatees; computing a median score from the raw scores for each attribute selected by the evaluator for the plurality of evaluatees, and generating said evaluator curve incorporating the evaluator's inclinations—judgment style and biases by averaging the mean score and median score.

The step of calculating from each evaluator curve in each hierarchy level a hierarchy behavior curve for that hierarchy level which accounts for the inclinations—judgment style and biases—of each hierarchy level further comprises, for each hierarchy level, the steps of computing a mean score for each attribute raw score for the plurality of workgroups in that hierarchy level; computing a median score for each attribute raw score for the plurality of workgroups in that hierarchy level; generating the hierarchy behavior curve for said hierarchy level incorporating inclinations and style of each hierarchy level by averaging the mean score and median score.

The method for evaluating and ranking personnel within an organization for performance and value may further comprise the steps of assigning a job assignment drift score for comparing evaluation scores related to job change to each evaluatee in each workgroup, said job assignment drift score being determined and assigned by the evaluator for that workgroup; and adjusting the adjusted score to reflect the inclusion of the job assignment drift score.

According to a further aspect of the invention, a system for evaluating and ranking personnel within an organization for performance and value embodied on a computer-readable medium for use with a computer, the evaluating and ranking system is provided. The system includes: means for creating an attribute data set for each workgroup, said attribute data set comprising subjective scores for each evaluatee for a plurality of attributes, said scores being determined and assigned by the evaluator for that workgroup; means for calculating from said attribute data set a raw score for each evaluatee, said raw score consisting of the sum of the scores for each of the plurality of attributes for that evaluatee; means for calculating from said attribute data set an evaluator curve for each evaluator which accounts for each evaluator's inclinations and style; means for assigning a plurality of hierarchy levels to the organization based on the management structure of the organization, each workgroup being assigned to one hierarchy level; means for calculating from each evaluator curve in each hierarchy level a hierarchy behavior curve for that hierarchy level which accounts for the inclinations and style of each hierarchy level; means for adjusting the hierarchy behavior curve for each hierarchy level by averaging the hierarchy behavior curve for a selected level with all other higher hierarchy levels; means for calculating an adjustment modulus for each evaluator by averaging the evaluator curve for that evaluator with the hierarchy behavior curve for the hierarchy level to which the evaluator is assigned; means for applying the adjustment modulus to the raw score for each evaluatee to arrive at an adjusted score for each evaluatee that mitigates the effects of bias, style, corporate culture, and other internal and external forces; and means for recording and storing said attribute data set, said evaluator curve data, said hierarchy behavior curve data, said adjustment modulus, said raw scores, and/or said adjusted scores on a computer readable medium for use with a computer.

These and other objects, features, and advantages of the present invention will become apparent from a review of the following drawings and a detailed description of the preferred embodiments of the invention.

BRIEF DESCRIPTION OF THE DRAWINGS

The present invention can best be understood in connection with the accompanying drawings. It is noted that the invention is not limited to the precise embodiments shown in the drawings, in which:

FIG. 1 is a chart showing raw attribute scores for eight evaluatees (no modification).

FIG. 2 is a chart showing raw score totals for each evaluation.

FIG. 17 is an Input Matrix

FIG. 18 is a Matrix with Scores and Totals

FIG. 19 is a chart showing Performance Text and the associated number value

FIG. 20 is a chart showing Matrix with Reminder Function

FIG. 22 is the Evaluation Form shown in FIG. 21 with information filed in.

FIG. 31 another example of an Evaluation Report according to an alternative embodiment of the invention.

FIG. 32 is an example of a Smartphone Display showing the Ranking Report only

FIG. 33 is an example of a more complete Report on a Smartphone

FIG. 38 is a chart showing the Top Five Performers FIG. 39 is a chart showing Drift Scores

DETAILED DESCRIPTION OF THE INVENTION

Figures 3, 4:
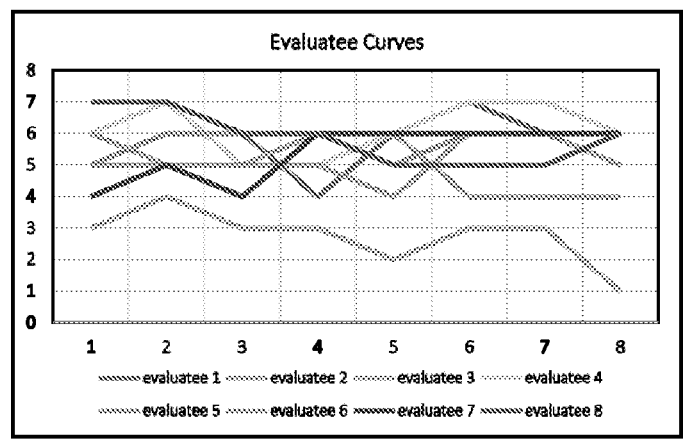
FIG. 3 is a graph showing typical evaluation curves.
FIG. 4 is a chart summing individual attribute scores.

For purposes of promoting and understanding the principles of the invention, reference will now be made to the embodiments illustrated in the drawings and specific language will be used to describe the same. It will nevertheless be understood that no limitation of the scope of the invention is thereby intended. The invention includes any alterations and further modifications in the illustrated devices and described methods and further applications of the principles of the invention that would normally occur to one skilled in the art to which the invention relates.

The Application of Digital Field Theory

Digital Field Theory was founded on the idea that all observed and recorded data exists within a virtual geometric domain for a given area of interest. Therefore, when combined with correlation functions, all data at every point in a three-dimensional virtual space are connected without exception and dependent on the fourth dimension of time. Each evaluation with its set of attribute scores is the initial building block of the geometric data field. Because every set must be, and therefore always is, part of the overall digital field, all the evaluation sets are interconnected to every other set. How they are connected architecturally is the essence of the personnel evaluation system. The field dimensions are defined by all the evaluation set positions that make up all the current and historical aggregated data for a given entity, such as an organization operating under some version of a management pyramid. The data field is divided into subcategories—hierarchies. The architectural shape, position, and level of each hierarchy define its' influence capacity on every evaluation. The highest and most influential is the overall manager responsible for all elements of an organization. Descending from the highest is the next level of management responsibility that directly reports to the highest level—the second level of the management hierarchy. This descending process continues for each management level until the lowest management level is reached, thus defining the lowest level of the management hierarchy.

At each hierarchy level are workgroup(s) made up of Evaluatees reporting to their immediate manager—the Evaluator. Each manager—the Evaluator—performs attribute evaluations as required from time to time, creating attribute data sets for each Evaluatee. Every Evaluatee is evaluated for the same set of attributes. Each of these attribute scores is placed in the same position in a matrix. The same matrix is used for every evaluation. Each evaluation consists of the same scale of graded scores for the same set of attributes for every Evaluatee. The graded scores for each of the Evaluatee's attributes are added, yielding their raw score total. This process is applied to every member of the workgroup (Evaluatees) and every Evaluator—the horizontal calculations. Next are the vertical calculations. Vertically, the attribute scores for each given attribute in the matrix are totaled. The score totals for each attribute in the workgroup are computed for mean and median and then averaged. Then horizontally, these scores form a polynomial-based curve that embeds the Evaluator's inclinations and style—the Evaluator's curve. This process is repeated for every evaluation. In a given hierarchy, all Evaluators(s) curves are computed for mean and median and then averaged, creating a given hierarchy's curve which has embedded in it the inclinations and style of each given hierarchy. Those curves are combined with the preceding hierarchy curve, computed for mean and median, and then averaged. This process provides the necessary elements for adjusting the raw evaluation scores by creating the Adjustment Modulus. The Adjustment Modulus is used to add, subtract, or change nothing to the Evaluatee's raw score total; thus, if required, mitigate effects of bias, style, corporate culture, and other internal and external forces.

The standard evaluation model observation points are placed in a matrix of graded levels as expressed in the derived evaluation curve. But the real meaning of the polynomial is subject to where its three-dimensional position occurs and its fourth-dimension time relative to the overall field parameters. Further, because every observation at its given moment in time constantly interacts with the entire digital field and continually redefines the measurement parameters to comply with the current realities of the entity using it.

The Essential Components of the Invention

The sum of the following components is the basis of scoring an individual's performance and values for an organization. The invention improves accuracy and fairness by computing an adjustment factor based on four factors:

1. Identifying and measuring an Evaluator's predispositions for judgment style and biases.
2. Quantifying the performance and value standards within the organization. (What is an "A," and what is an "F," and all the shades in between?)
3. Imposing an organization's culture and current perceptions on the evaluation process.
4. No Evaluator can evaluate an Evaluatee without being subject to evaluation as a prerequisite.

Each of these factors, as an aggregated sum, produces an adjustment of the outcome score. The modification can be variably positive, variably negative, or neutral. Known systems ignore all these factors (69 systems have been studied and analyzed considering 86 features). The invention is a series of calculations that provide a digital engine for performing the complex analysis of personnel evaluation within a given organization. The entire process can be completed and reported within 5 to 10 minutes, reducing the overhead to a minimal expense. The invention can also be used for other evaluations, such as a tool for mentoring. The system can be used for different types of assessment such as sports, reviewing, jurors, recruiting, et al.

One of the unique aspects of the invention is placing all managers in their proper place in the existing management hierarchy architecture. Management hierarchies are the layers of management reporting responsibility. The invention classifies the top hierarchy—level A—for the individual responsible for everything—typically a CEO. Under that position and reporting to Level A are the managers who directly report to Level A—the Level B managers. The next level of authority is Level C, which directly reports to the level B managers and likewise for the rest of the organization. This involves the behavior of every hierarchy level and their collected effect on each of the other hierarchy levels. Level A is the highest and most impacting level. The behavior and attitude of the level A management authority influences an organization's overall biases, tendencies, and judgment styles; it also guides and promotes the organization's culture.

Further, level A imposes both internal and external conditions affecting the organization. Examples are financial condition, the economy, pressure from the investment community, integrity, lack thereof, etc. The real-time interaction from these forces on every evaluation is one of the leading advantages of the invention process. The digital architecture and its interaction with the entire organization affect every evaluation. Therefore, no assessment is ever independent but part of all the organization's digital field theory evaluation data.

The top-level hierarchy A influence is always present in all hierarchy levels, making it the most dominant. Beginning at level B is the formation of the level B behavior data consisting of the preceding level A behavior data and the level B behavior data. The two data sets are combined to form the level B behavior data. As the cascade descends, each additional level adds its presence by repeating the same method by combining each given level's behavior data with the preceding level's behavior data. The process ends at the lowest hierarchy level. It is composed of the prior hierarchy level data consisting of data elements from all the preceding hierarchy levels.

The algorithmic process always includes the complete range of evaluation data for generating, if required, score adjustments. This is referred to as the Adjustment Modulus. Depending on the Adjustment Modulus value, the final score can be raised, lowered, or unchanged. The system moves all evaluations towards the same measurement standards, including compliance with the organization's style and culture. The Evaluator's perception of "A" to "F" is recalibrated, if required, by realigning the reported scores towards the organization's definition of "A" to "F." This realignment provides fairness, accuracy, and, above all, usefulness for management.

Definitions

Evaluator—The individual evaluating the Evaluatee (The person directly responsible for the Evaluatee.)
Evaluatee—The person being evaluated.
Attribute—There are two types of Attributes measured.
Performance Attribute—The factors that compose job execution individually and within a group.
Value Attribute—The factors that define a person's principles of honesty, behavior, and judgment.
Specific Performance Attributes (The Evaluatee)
  Task (Job) Execution—The progress of an assigned task—transpiring, achieved, or terminated,
  Leadership/Decisionship—The ability to lead and/or influence a workgroup positively.
  Proficiency/Initiative—An individual's professional skills and the ability to apply them to a task.
  Stress/Anger Management—Performance under stress when experiencing a threat or insult. Team Skills—The ability to work and communicate with team members.
Specific Value Attributes
  Ethics/Intellectual Honesty—A person's moral principles and assertion, whether favorable or unfavorable.
  Tenacity—The person's persistence and resilience regarding task execution.
  Continuing Education—Job-related knowledge acquisition—constant self-teaching and/or formal education.
Job Assignment Drift—Measurement related to job assignment change vs. initial job description. Adjustment Modulus—the correction factor derived by the invention that is applied to the raw score.

The following are the report features and innovations:
1. Evaluate-the-evaluator analysis.
2. Determine behavior & operating standards for the entire organization.
3. A five-to-ten-minute evaluation interaction followed by a real-time report.
4. Works on almost any current desktop, laptop, tablet, and smartphone.
5. Report data consists of the following:
   a. Score (numerical—1 to 100). Score progress (percent).
   b. Individual attribute progress for eight attributes (percent).
   c. Rankings
      i. Group (numerical position and percentile based on workgroup size).
      ii. Company (numerical position and percentile based on organization population).
   d. Job Assignment Drift (indication of a job change—text).

The evaluation results become the basis for all major HR decisions—promote, fire, pay raise, bonus, transfer, and performance analysis.

Invention Details

The system requires a minimal number of Evaluatees who have been evaluated for a given organization to initialize the process (15% approximately. The evaluations should be a minimum of two per Evaluatee). If the organization previously performed evaluations with an available database, that data can possibly be reorganized and used to initialize the system. There are nine items to be scored. Five are for performance, three are for values, and one is for job assignment drift (see Definitions). They are as follows:

Performance Attributes.
  J/E—Task (Job) Execution.
  P/I—Proficiency/Initiative.
  L/D—Leadership/Decisionship.
  S/AM—Stress/Anger Management.
  T/S—Team Skills
Value Attributes.
  E/H—Ethics/Intellectual Honesty
  T—Tenacity.
  C/E—Continuing Education
Job Assignment Drift The assessment consists of an evaluator selecting scores for each of eight attributes plus job assignment drift for an individual (Evaluatee) being evaluated. Chart A lists the scale choices using text in place of numbers—other words, icons, emojis, etc., can be substituted. The words or symbols chosen are based on common usage. Therefore, best understood by a large, perhaps the largest, group of the population in any given country. The choices will change for different cultures and languages. Each choice, however, is associated with a score number. The score varies from 1 to 7 or an equivalent scale. One represents the lowest score 1 and 7 the highest.

| Performance and Value Attributes | |
|---|---|
| Exceptional | 7 |
| Excellent | 6 |
| Good | 5 |

|  |  |
| --- | --- |
| Average | 4 |
| Mediocre | 3 |
| Borderline | 2 |
| Adverse | 1 |
| Job Assignment Drift | |
| None | 1 |
| Minimal | 2 |
| Moderate | 3 |
| Extreme | 4 |

Chart A—Performance Text and the Associated Number Value

The attributes are defined in the Definition section of this document (see Definitions). The first five are for performance characteristics, the following three are for value, and the last is for job assignment drift. The purpose of Job Assignment Drift is to be able to compare evaluation scores related to job change. The score numbers can be changed if the ratios are consistent with curve polynomial values (see the raw score polynomial below).

FIG. 1 shows a typical set of evaluation (raw attribute) scores that have been chosen by a manager (the Evaluator) of a workgroup consisting of eight persons (evaluatees). As a result of the attribute scores (the variables), a polynomial is created for each Evaluatee, and totaled producing a raw score total for each individual. The following is the raw score polynomial formula:

$$\text{Raw Score} = (J/E)x_1^n + (P/I)x_2^n + (L/D)x_3^n + \\ (S/AM)x_4^n + (T/S)x_5^n + (E/IH)x_6^n + (T)x_7^n + (C/E)x_8^n$$

Raw score means the score has not been subjected to the adjustment process. $x^n$=Exponent. The value of x in the examples is 1. Therefore, all attributes in this disclosure are symmetrically weighted in the examples. Asymmetric weighting can be achieved by changing exponent values giving at least one attribute more or less influence over the raw score. In the case of asymmetric weighting, the Raw Score equation has to be recalibrated. The raw score total number is the unadjusted rating for each Evaluatee. FIG. 2 shows the raw score totals in the circle for the group of eight Evaluatees shown in FIG. 1. FIG. 3 shows the polynomial curves for each of the eight evaluates shown in FIG. 1. Each evaluation includes the Evaluator's biases, judgment style, and the effects of corporate culture and other internal and external effects.

Figures 5, 6:
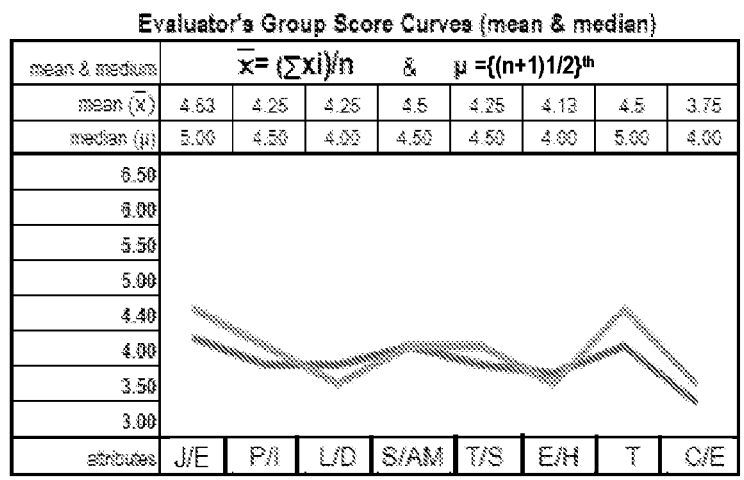
FIG. 5 is a chart showing score totals—computed for mean—$\bar{x}$, and median—$\mu\mu$.
FIG. 6 is a chart and graph showing the scores are expanded to 2 decimal places, and curves that are generated for $\bar{x}$ and $\mu\mu$
Figure 7:
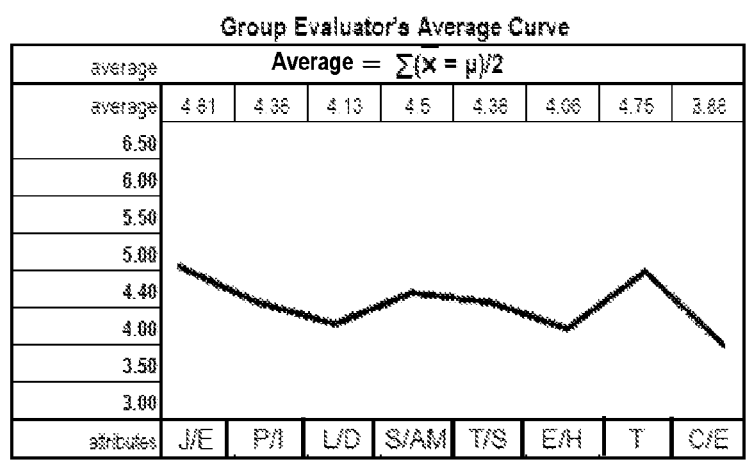
FIG. 7 is a chart and graph showing mean & median averages capturing a manager's evaluation behavior.

FIG. 4 shows the summing of the individual attribute scores (the verticals). The score totals for each attribute in the workgroup are computed for mean—$\bar{x}$, and median—$\mu$ (Md), which is shown in FIG. 5. The scores are expanded to two decimal places or more. As shown in FIG. 6, curves for the evaluator's group score can now be generated for the mean and medium. The Scores are expanded to 2 decimal places, and the curves are generated for $\bar{x}$ and $\mu\mu$. The mean and the median are averaged, generating an average curve incorporating the managers evaluation behavior, as shown in FIG. 7.

Figure 8:
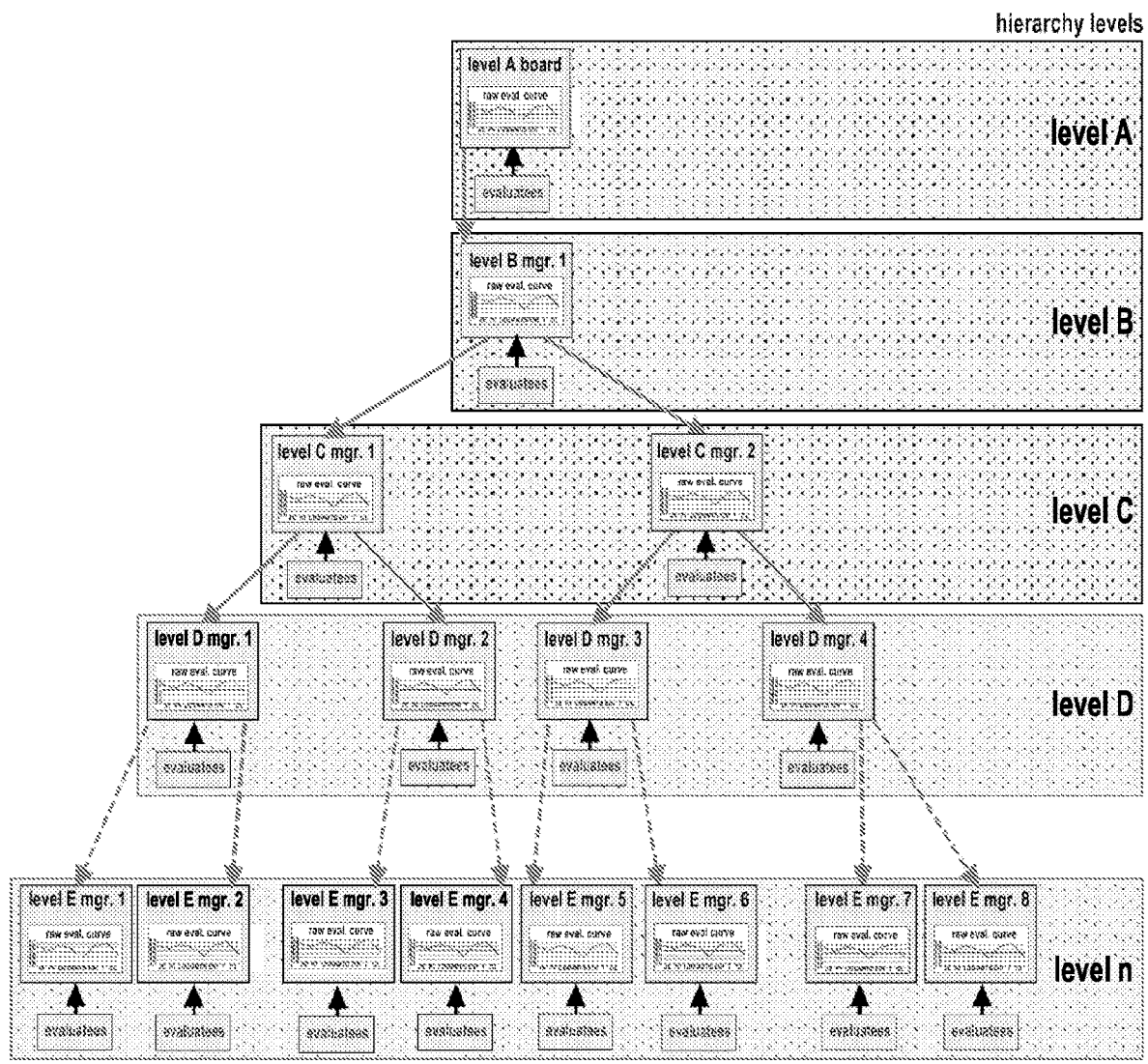
FIG. 8 is a symmetrical—Idealized organization chart with hierarchical levels

At this point of the process, it is necessary to know where a given manager is assigned in an organization's management hierarchy structure. The system of the present invention requires knowing and placing all managers in their proper place in the existing management hierarchy. The management hierarchy recognizes how an organization has designed its management reporting responsibility—usually referred to as the organization chart or management diagram. The system of the present invention classifies the top hierarchy level manager(s)—hierarchy level A—as in any organization, the chief individual responsible for everything—the CEO, the managing director, the president, the chief of staff, etc. It can begin at the Board level. Under that position are the managers who directly report to the chief manager—hierarchy level B. Under those levels, B managers are the next level of managers who directly report to the level B managers—level C. FIG. 8 show an idealized version of an organization with established symmetrical hierarchy levels.

Figure 9:
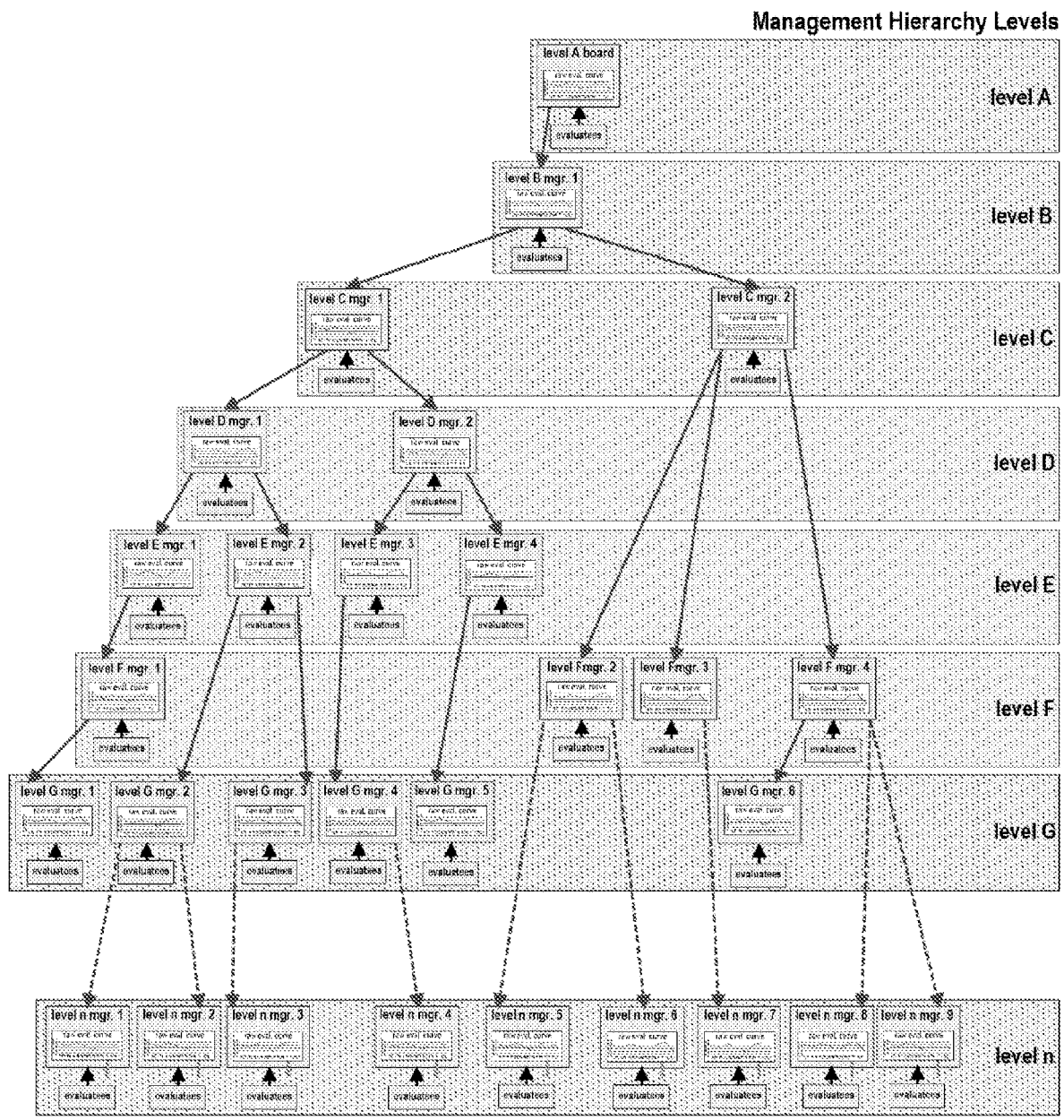
FIG. 9 is a symmetrical—Typical organization chart with hierarchical levels

In reality, most organization's management hierarchy is more complex and asymmetrical. FIG. 9 shows a typical asymmetrical organization management pattern. All managers must be appropriately located in the system of the present invention—placed in their proper management position in the management hierarchy structure. As changes occur, such as promotions, those managers may have to be relocated into their new hierarchy local. This is essential to the integrity and accuracy of the system.

Once a group manager has evaluated an Evaluatee or a group of Evaluatees (employees) that he or she is responsible for managing, then that Evaluator's behavior curve can be computed by computing each of that manager's mean—$\bar{x}$, and median—$\mu\mu$, and then calculating the average [av. ($\bar{x}+\mu$)/2)] for each attribute they evaluated for at least one Evaluatee. This is the manager's behavior curve for whatever moment in time the computation occurred. Please note that this curve is subject to change with every evaluation occurrence. Although the chance of significant change is small, it still can occur and is fundamental to digital field theory—every evaluation affects every new evaluation, and if re-computation or recompilation is required, once again, it affects every existing evaluation. If, and there almost always are, additional managers with reporting groups in the same hierarchy who also perform evaluations, their performance curves are also equally processed creating additional manager behavior curves. The additional curves are summed and treated to the same process and averaged creating a manager or manager's behavior curve characteristic for that given hierarchy.

Figures 10, 11, 12:
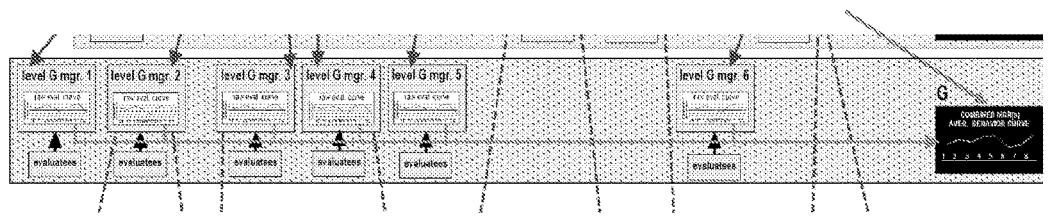
FIG. 10 is a workgroup in Hierarchy G combined managers' average behavior curve
FIG. 11 is a chart showing scores for six workgroups
FIG. 12 is a chart showing Median, Mean, and Average Computations

At this point all the work groups in the given hierarchy are illustrated along with the Hierarchy G combined manager or manager's average behavior curve which is shown in FIG. 10. In the disclosure example shown in FIG. 9, there are six workgroups in the level G hierarchy (workgroups 1, 2, 3, 4, 5, & 6) Each work group will have a manager responsible for evaluating the evaluatees that he or she is responsible for. FIG. 11 shows each manager's chosen scores for each of the six workgroups (the example has eight employees in each group and all the individual attributes are totaled (the verticals).

Figure 13:
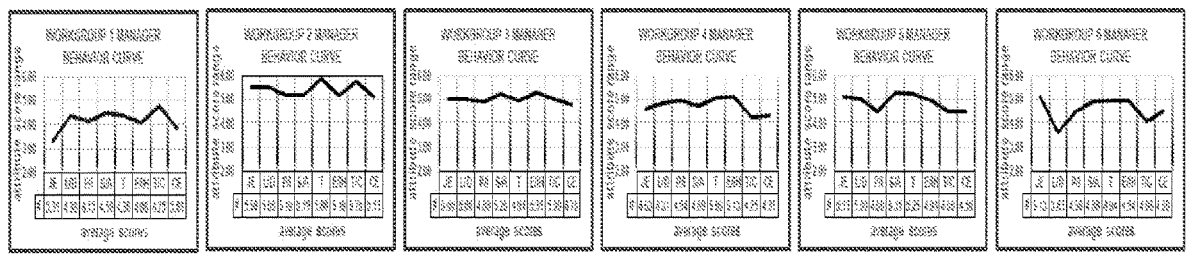
FIG. 13 is a series of graphs showing the manager's Behavior Curves
Figure 14:
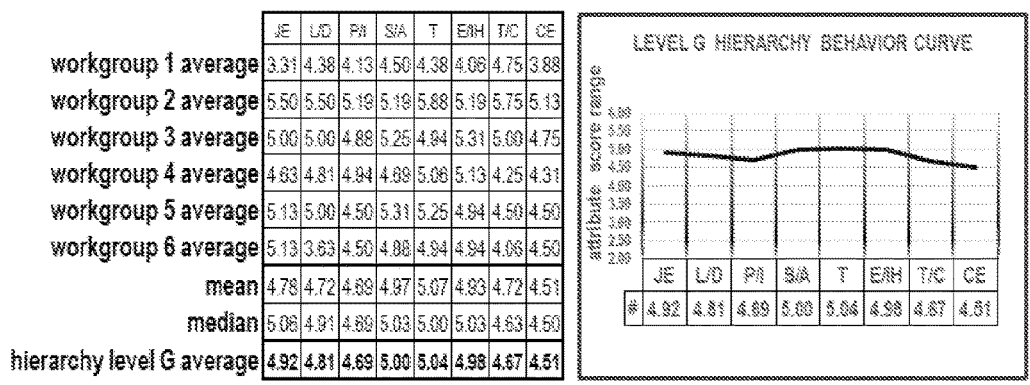
FIG. 14 is a chart and graph of Level G Managers Behavior Curve

The next step, shown in FIG. 12, is to compute the median and mean for each of the eight attribute verticals in each of the six workgroups followed by summing and computing their average—(median+mean)/2. All the attribute averages for each specific workgroup—all eight attribute average scores—are integers representing a curve. The curve for each workgroup manager represents the scoring behavior of each manager as shown in FIG. 13. Each of the 6 workgroup curve averages are again aggregated and processed using the same technique as described in FIGS. 1 through 7 generating a curve that represents the average behavior of all 6 for the level G manager's evaluation behavior as shown in FIG. 14.

The next part of the process must occur before the final adjustment calculation is possible. This involves the behavior of every hierarchy level and their collected effect on each of the other hierarchy levels. It begins with the highest and most impacting level—level A—and its effect on all the other descending levels. As previously noted, level A is the manager, or group, responsible for everybody. The behavior and attitude of the level A management authority is not only indicative of an organization's overall bias tendencies and judgment styles, but guides and promotes the organization's culture. Further, level A imposes both internal and external conditions effecting the organization. Examples are such things as the financial condition of the organization, the economy, pressure from the investment community, integrity, or lack thereof, etc. are all contributing to the behavior curve at any given time. The real-time interaction with these forces on every evaluation is one of the leading advantages of the process of the present invention. The hierarchy levels and their interaction in descending order can be described as a "Management Tree" as shown in FIG. 15.

The Management Tree and its interaction with the entire data field affects every evaluation—no exceptions. All evaluations for each given entity mean every evaluation that has ever occurred from the present to the date of initiation of the system of the present invention is included, therefore no evaluation is ever independent but is part of the data totality. The system and method of the present invention is based on digital field theory. But there is a practical aspect to consider. Looking back at a certain point there will be a large body of data that no longer effects the modification algorithm meaningfully—perhaps only the third or fourth decimal place. The system can, if meaningful, determine a back chronological cut-off time that has become exponentially insignificant. The look-back is not time based, but rather affect based. Therefore, the cut-off time could be longer or shorter. A possible method of determining the cutoff time is measuring when look-back data contributes less than 1% to the modification algorithm.

Figure 15:
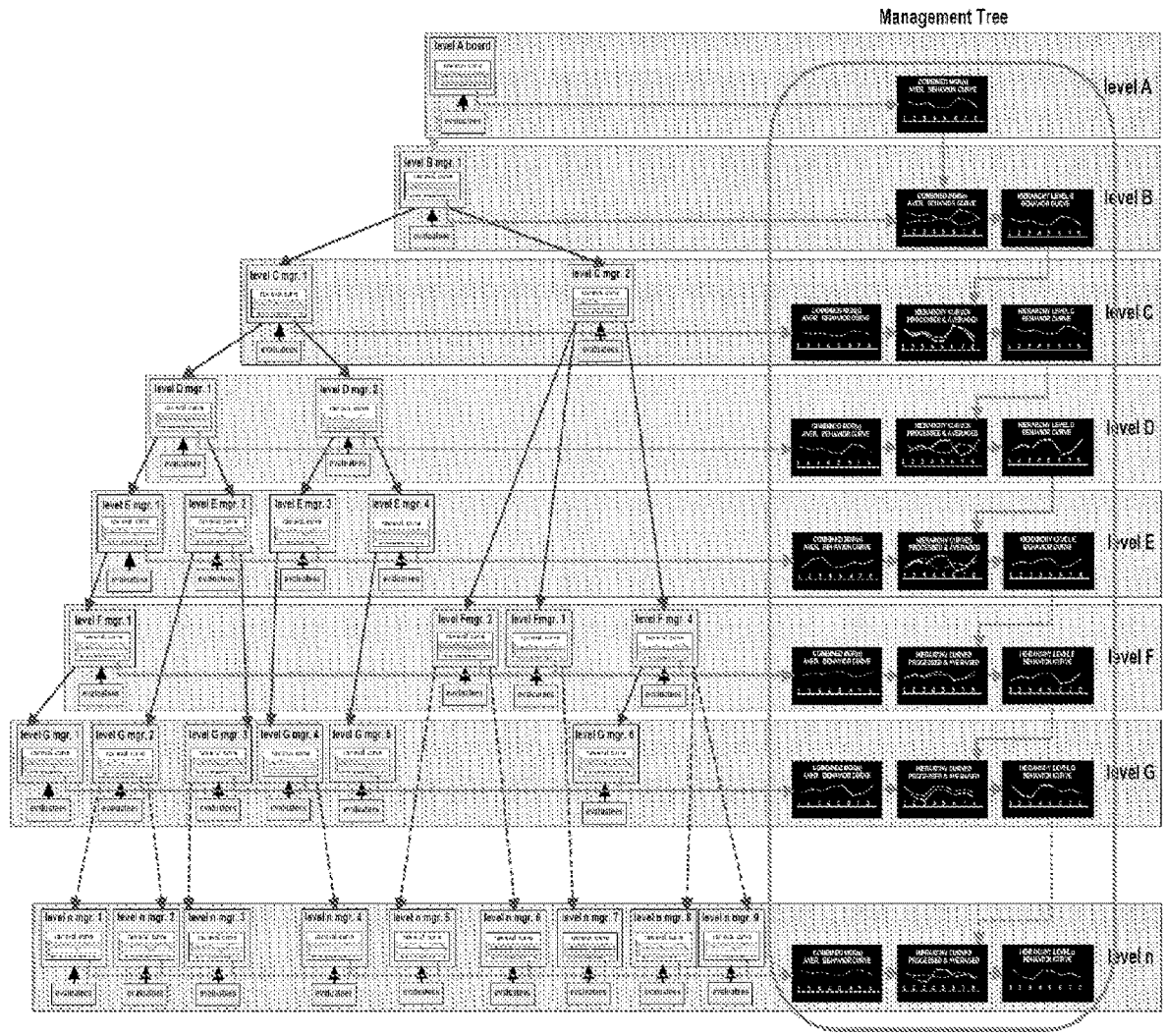
FIG. 15 is the Management Tree according to one aspect of the present invention.
Figure 16:
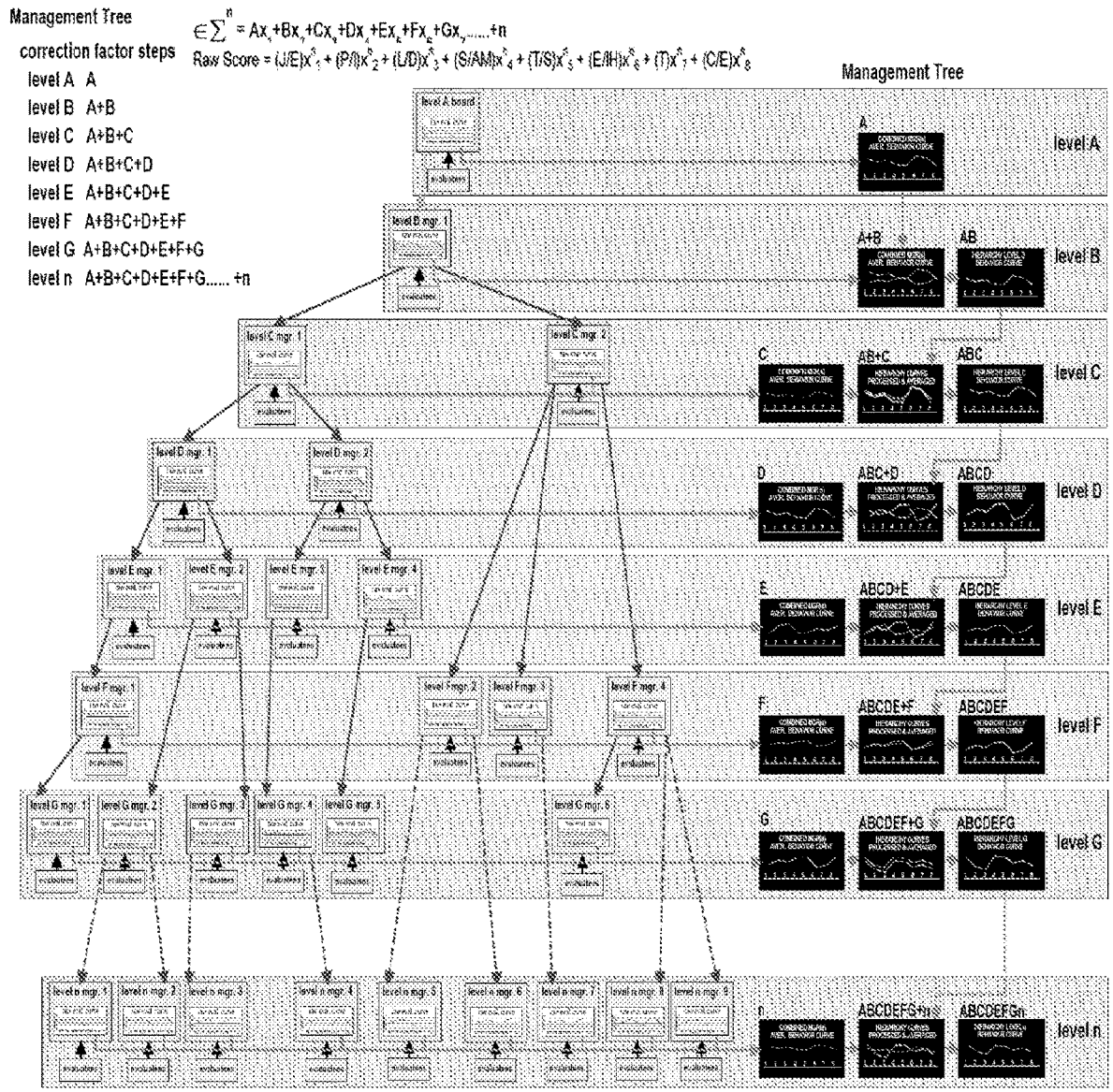
FIG. 16 is a more detailed version of the Management Tree shown in FIG. 15.

FIG. 16 shows a more detailed view of the Management Tree shown in FIG. 15, where the letters that appear above each hierarchy curve. A is at level A, AB is at level B, ABC is at level C and so on. It continues on through the descending management tree to level n, which is composed of contributions from every hierarchy level—ABCDEFGn. The "Management Tree" is a multilevel series of digital fields that are interconnected. The top-level hierarchy A (Hierarchy Level A is always a raw curve with no adjustment possible since there is no preceding behavior curve available to derive an averaged behavior curve) is always present in all hierarchy levels, making it the most dominant. Beginning at level B is the formation of the level B behavior curve. It consists of the preceding level A behavior curve and the level B manager(s) average behavior curve. The two curves are processed, summed and averaged to form the level B behavior curve. As the cascade descends each additional level adds their presence by repeating the same process combining each given level's manager(s) average behavior curve with the preceding level's behavior curve. The "Management Tree" finally ends with the lowest hierarchy level—n—that is composed of the preceding hierarchy level curve which is in turn composed of elements from every preceding hierarchy level curve.

Inherent in the process is the Evaluator's opinion of an "A" and an "F"—excellence vs. failure and all the shades in between. The sum of each Evaluatee's curve polynomial (the variables) is their "raw" evaluation score (the unadjusted score). The system of the present invention will, when all the algorithmic factions are completed for any given evaluation, create an "adjustment modulus" for the current evaluation changing it, if required, by modifying all the individual attribute scores, and thus, the total evaluation score.

The algorithmic factors include the complete range of evaluation curves that have been collected for a given organization at every "Management Tree" hierarchy level and summarily processed. Therefore, the specific "adjustment modulus" is available and is applied to each of the five performance attribute curve variables and the three value attribute variables for a given evaluation (job drift is not subject to correction). Depending on the effect of the "adjustment modulus", a reshaping of the current Evaluatee's evaluation curve can occur, and with it, a new or unchanged evaluation score total. The total can be the same as the raw score total because there is no reason to change or, conversely, decrease or increase the Evaluatee's score total because the system of the present invention has detected reasons to change. The process always determines the effects of an evaluator's proclivities—bias and judgment style, if any—and includes the Evaluator's and organization's measurement standards, style, and culture. The idea is to achieve the same measurement standards regardless of any evaluator's biases and judgment styles and compliance with an organization's style and culture. What began as an Evaluator's perception of "A" to "F" is recalibrated, if required, by realigning the reported scores towards the organization's definition of "A" to "F". This realignment provides fairness, accuracy, and, above all, usefulness for management.

It is possible to modify any of the attribute's importance or minimization by adjusting the coefficient value of at least one attribute. The current coefficient, as previously mentioned for all attributes is one, therefore all are equal.

Circumstances may arise where not all Evaluators are initially evaluated, whereby this invention will extrapolate from similar historical data, and replace the missing information until said Evaluator has been evaluated. In addition, personal growth and challenges can cause deviation from past Evaluations, such as marriage, divorce, loss of a child, combat deployment, near-death experience, bankruptcy, out-of-control vices, et al. The system has the ability to look back to the Evaluatee's evaluation history, thus providing management with information that can render more equable decisions when considering the Evaluatee's future.

At this point the following data is available for processing the Evaluatee's adjusted score, if required, with all the requirements having been met to compute the "Adjustment Modulus":

1. The Evaluatee's curve (the polynomial).
2. The Evaluatee's raw score total (the sum of the polynomial variables).
3. The Evaluator's behavior curve (The Evaluator that conducted and scored the evaluation.)
   a. The Evaluator's behavior curve for at least one Evaluatee in the same workgroup.
   b. If there is more than one Evaluatee evaluated by the Evaluator in the same workgroup the evaluations are processed ($\bar{x}$, and $\mu\mu$, and averaged) to generate the Evaluator's Behavior Curve
4. The Hierarchy Behavior Curves.

Entering Data

Another feature of this invention is the method of data entry. The methodology used to determine the curve data has been detailed in the first section in the INVENTION DETAILS. A matrix is exhibited as an electronic, optical, or mechanical display in the form of a 7×8 matrix plus a supplementary 1×4 matrix. As best shown in FIG. 17, these represent the choices an evaluator has for scoring inputs for the evaluation. These can be either clicks, touches, or some other form of activation. The 7×8 matrix consists of seven (7) horizontal levels of attribute scoring. Beginning on the left is the lowest score (1) and, on the right, is the highest score (7). The scores can be represented by numbers, text, letters, colors, shades, icons, patterns, sounds, or some other form of delineation. The 1×4 consists of four levels again consisting of the lowest on the left (1), and the highest on the right (4).

On top of the matrix is an additional row consisting of seven (7) text categories. It is used to describe the trait of each of the scoring items. The text could be replaced by icons, colors, shades, patterns, sounds, or some other form of delineation. On top of the additional row of text is another row. It is displayed in shades of white-grays-black or could be colored. This row is used as a reminder to the Evaluator of what hierarchy level is being applied. For example, if it is color, this row could display the colors that are used in the matrix that begin with bright green (7) and gradually change to bright red (1). If it were shades such as grays as in FIG. 17, the row would display the different shades of gray beginning with white-grays-black. In FIG. 17, the display begins with pure white on the right, indicating the highest score, and gradually changing to black on the left indicating the lowest score. These could be substituted by other forms of delineation as previously described. They could be icons, emojis, binary—(yes or no, or multiple choice), or some other form of level indication). There is a plethora of colors that also would work. Alternately the scoring method could be in the form of questions, icons, binary, yes or no, multiple-choice, hatch gradients, or some other form of score level indication. To the left of this column is another column describing attribute classification. In FIG. 17, the classifications are divided into performance attributes and value attributes. In FIG. 17, five attributes are classified as performance attributes, and three are classified as value attributes. These have been chosen as optimum through research but could be changed through experience. On the right is an additional column that is dedicated to totals. When a score is selected by the Evaluator, it is repeated in this column along with the characteristic background color or white-grays-black as shown in the matrix with scores and totals shown in FIG. 18.

The last entry is Job Assignment Drift, which is located in this illustration at the bottom left of FIG. 17. Job Assignment Drift—Hiring a person for their training and/or experience consistent with a job definition but being assigned to another function over time. This can be good or bad, i.e., hiring a person for Marketing, but moving that person to Sales. Poor performance can be explained as a result of job drift. On the other hand, good performance can be a revelation. In any case, it is significant in the evaluation process. There are four (4) selections possible: "none," "minimal," "moderate," and "extreme." These can be replaced by numbers, colors, shades, icons, and similar forms of delineation. When Job Assignment Drift is answered as the last evaluation input processes of the present invention the data and returns with, if appropriate, the Adjusted score total. Once all the attributes have been entered a total appears at the bottom right of FIG. 17 as the "raw score total" number followed by the "adjusted score total" which accounts for job assignment drift.

All scores at the moment of real-time are recorded, and the system remembers all the data. All evaluation data is used to adjust current and future scoring and rankings. This includes the Evaluatees workgroup and organization, and any other personnel evaluated in real-time. The matrix could consist of more or less than the current 7×8 positions with additional orders of magnitude and inputs. The current choice represents a resolution selected for the essentials, convenience, and speed, The same applies to the 1×4 matrix.

As additional aide can be acquired by clicking twice or touching for 3 seconds or longer any one of the attribute titles, a screen will appear defining and describing the chosen attribute in greater detail. This can aid the Evaluator in comprehending the meaning of the attribute if he or she requires a discussion in greater depth in order to improve their scoring proficiency.

An additional aspect of the invention is shown in FIG. 20. On the lower right is a display showing pictures of past Evaluatees. Under each photo is the score number that the Evaluator chose for each of those Evaluatees for the same attribute. Towards the middle of the display is an icon of a finger pointing (The icon is only to aid in this present description). The photos and their scores appear by clicking, touching, or similar data input for the attribute of concern. This utility can be helpful when the Evaluator is having a problem deciding what score should be assigned to the present Evaluatee for a given attribute. By looking back at similar score assignments, the Evaluator remembers the basis of past scoring to improve equivalence, promoting fairness.

Figure 21:
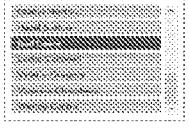
FIG. 21 is an Evaluation Form
Figure 22:
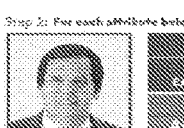

FIG. 21 shows a screen for entering data into the system from a desktop or laptop screen. The evaluation form can take many styles and colors. FIG. 21 is a convenient version of the form. Regardless of the entry method, the system will always place the data into the matrix in the appropriate position. In the upper lefthand position is a list of every team (workgroup) member with their name, ID, position, department, sub-department, date, and time. In the center of the screen is a graphic displaying the performance and value attributes. Across the screen is a graphic displaying the performance and value attributes. When clicking or touching a particular attribute, a screen appears listing the scoring choices for that attribute. The screen disappears immediately by clicking or touching the scoring choice, followed by the rectangle associated with that attribute displaying the choice text and the associated shade (or color). When a team member is selected, their picture appears on the left. At the lower right are clear and submit buttons. At the upper right are standard utility buttons such as print, etc. FIG. 22 shows the evaluation form of FIG. 21 with all evaluation information filled in.

Figure 23:
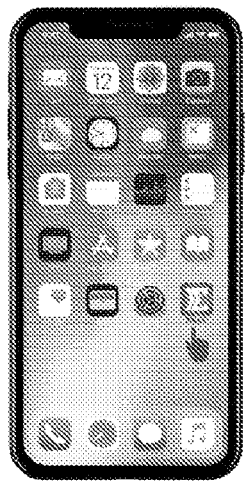
FIG. 23 is the App Home screen with ΣOlon™ app icon
Figure 24:
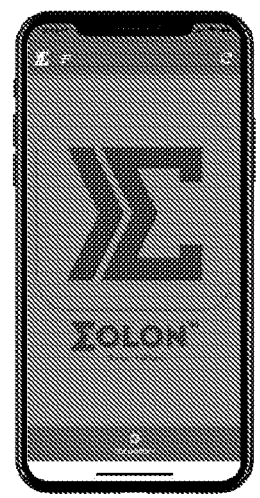
FIG. 24 is the App Home screen with ΣOlon™ logo
Figure 25:
FIG. 25 is the App Select a Team Member screen
Figure 26:
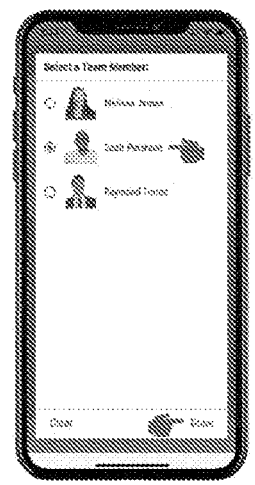
FIG. 26 is the App Team Member Selected screen
Figure 27:
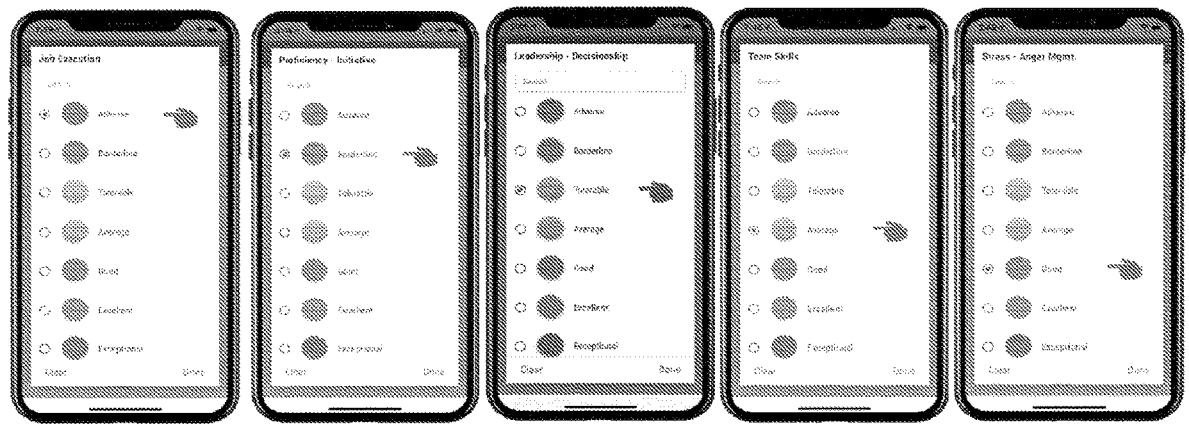
FIG. 27 is a series of screen App Examples of Selecting and Scoring the 5 Performance Attributes
Figure 28:
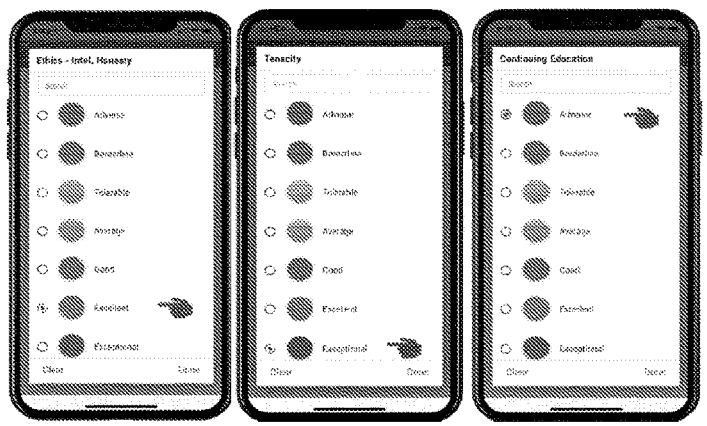
FIG. 28 is a series of screen App Examples of Selecting and Scoring the 3 Value Attributes

FIG. 23-FIG. 29 show displays of Evaluation Forms for the smartphone app version of the system and method according to the present invention. FIG. 23 shows the App Home screen with the app icon for the present invention. FIG. 24 shows the App Home screen once the icon in FIG. 23 for the present invention has been selected. FIG. 25 shows the App Select a Team Member screen. FIG. 26 shows the App Team Member Selected screen. FIG. 27 shows App Examples of Selecting and Scoring the 5 Performance Attributes. FIG. 28 shows Examples of Selecting and Scoring the 3 Value Attributes.

Figure 29:
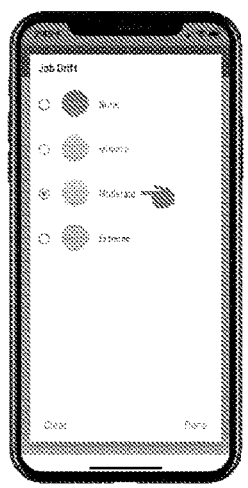
FIG. 29 is a screen App Example of Scoring Job Drift

FIG. 29 shows Example of scoring Job Drift.

Reports

The following are examples of some of the reports provided by the system of the present invention. Some of them were described at the beginning of this disclosure.

They can be displays in the form of computer or smartphone screens and/or printed visuals. They can be channeled for reporting limited outcome details or opened to all types of analytical complexities. The ubiquitous reporting capabilities of the system of the present invention are only possible because all evaluation data is interconnected through the all-encompassing digital field architecture as supported by the management tree technology.

Figure 30:
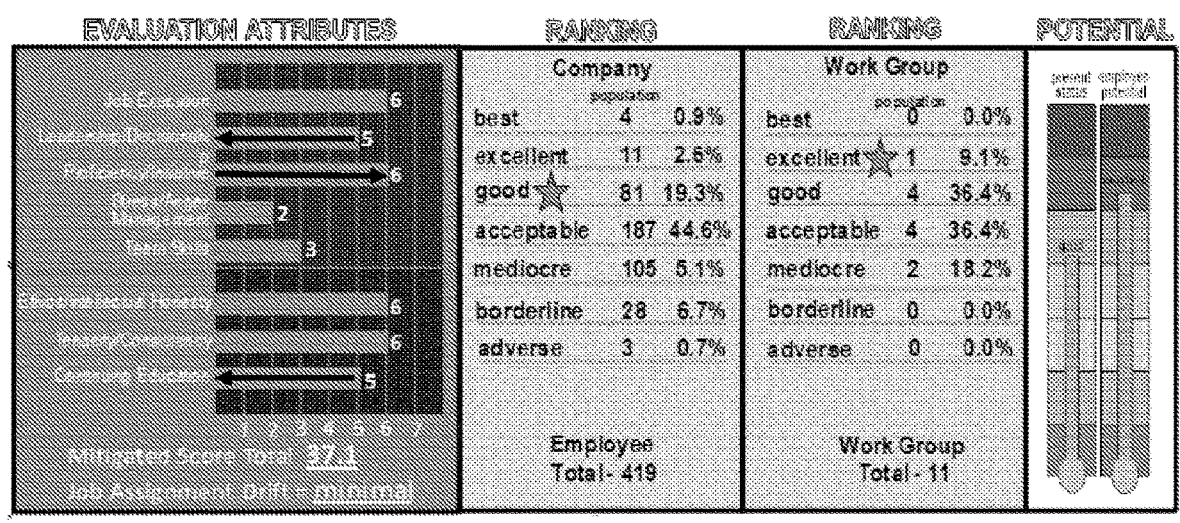
FIG. 30 is an example of an Evaluation Report according to one embodiment of the present invention.

FIG. 30 shows an example of an Evaluation Report. This report starting on the left displays each attribute score graphically along with the scoring number. In the attributes where arrows appear indicate change increase or decrease. Those with no arrows indicate no change. At the bottom are the adjusted score total and the Job Assignment Drift report. Moving to the right are the Evaluatee's rank in the company and their particular workgroup. The rankings are reported numerically and percentage-wise in both the population and workgroup. The populations of both sectors also are reported. On the extreme right is a graph illustrating the Evaluatee's current company status along with potential. The stars represent the evaluatee.

FIG. 31 shows another example of an Evaluation Report. This Evaluation Report applies to desktops, laptops, and smartphones. However, rankings and potential are not available. Score total and overall rating zone and confidence level are reported as texts.

FIG. 32 shows an example of a Smartphone Display showing the Ranking Report only, while FIG. 33 shows an example of a more complete Report on a Smartphone.

Figure 34:
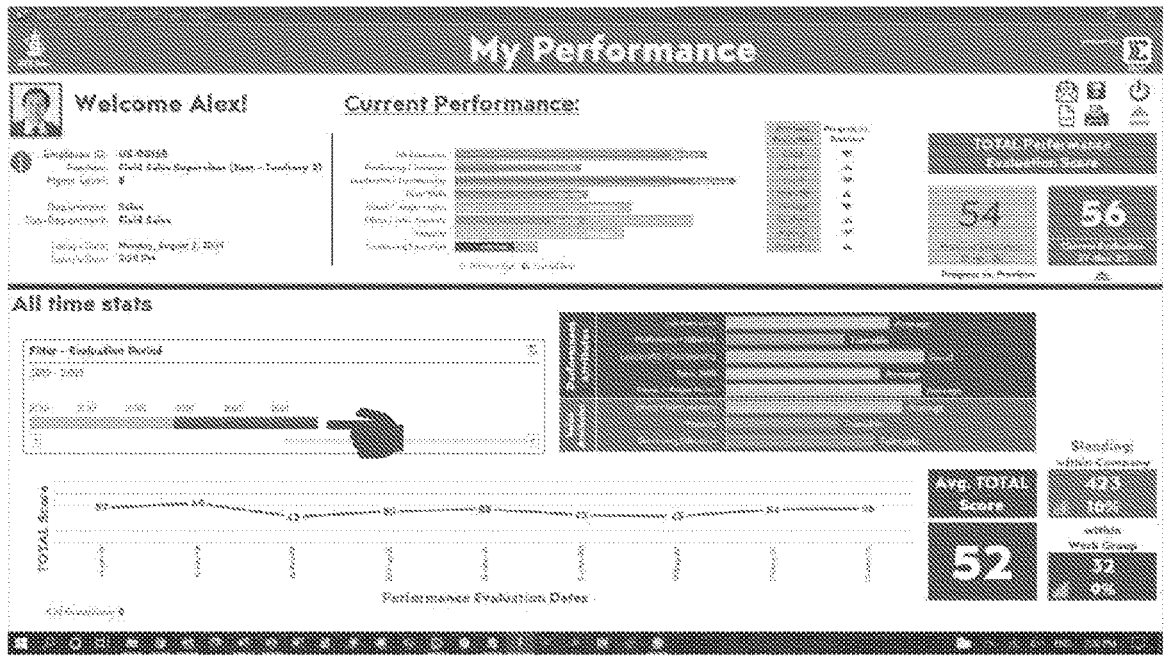
FIG. 34 is an Example of a comprehensive Evaluatee report with a 3-year look-back
Figure 35:
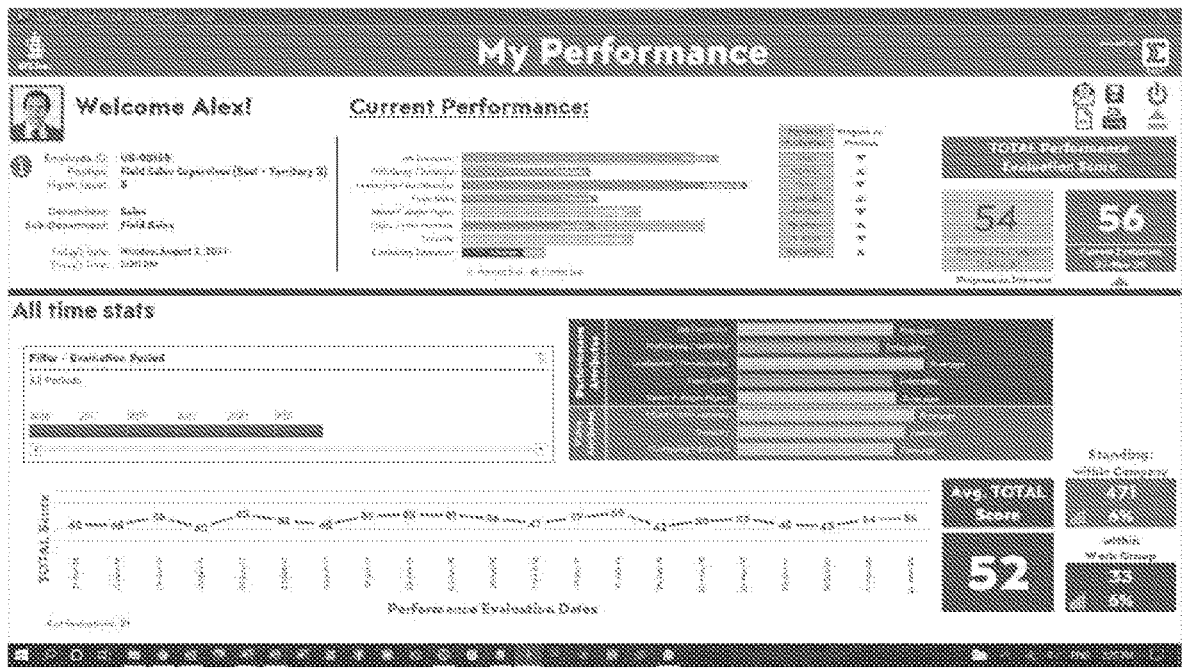
FIG. 35 is an Example of a comprehensive Evaluatee report with a 5-year look-back

FIG. 34 shows an example of a complete Evaluatee report with a 3-year look-back, while FIG. 35 shows an example of a comprehensive Evaluatee report with a 5-year look-back. Starting in the left-hand upper corner is the employee picture, ID, position, management level, department, sub-department (if any), date, and evaluation time. Moving to the right are the attribute scoring results in a horizontal bar graph form. Each bar has a lighter bar behind it that represents the results of the last evaluation. Text appears on each bar evaluation score level's right side as text (see Chart A Performance and Value). To the right is a column displaying the last evaluation scores (reported as text). Further right is a column of pointers indicating progress versus the previous evaluation. To the right of that are utility buttons. Below the utility buttons are the last evaluation total score, and next to it is the last total score. Each of the scores is dated. Below the current report section is a solid line that caps the "All time stats" section. To the left top is a frame titled Filter—Evaluation Period. This covers the years of an Evaluatee's evaluation history. It is divided into years. By selecting the periods of interest, a graph appears covering the selection of interest displaying every evaluation score and date. At the same time to the right, a horizontal bar graph depicting the average ratings for the period(s) selected. To the lower right, the average total score appears, and to the right are the Evaluatee's average standings in the company and workgroup for the selection.

Figure 36:
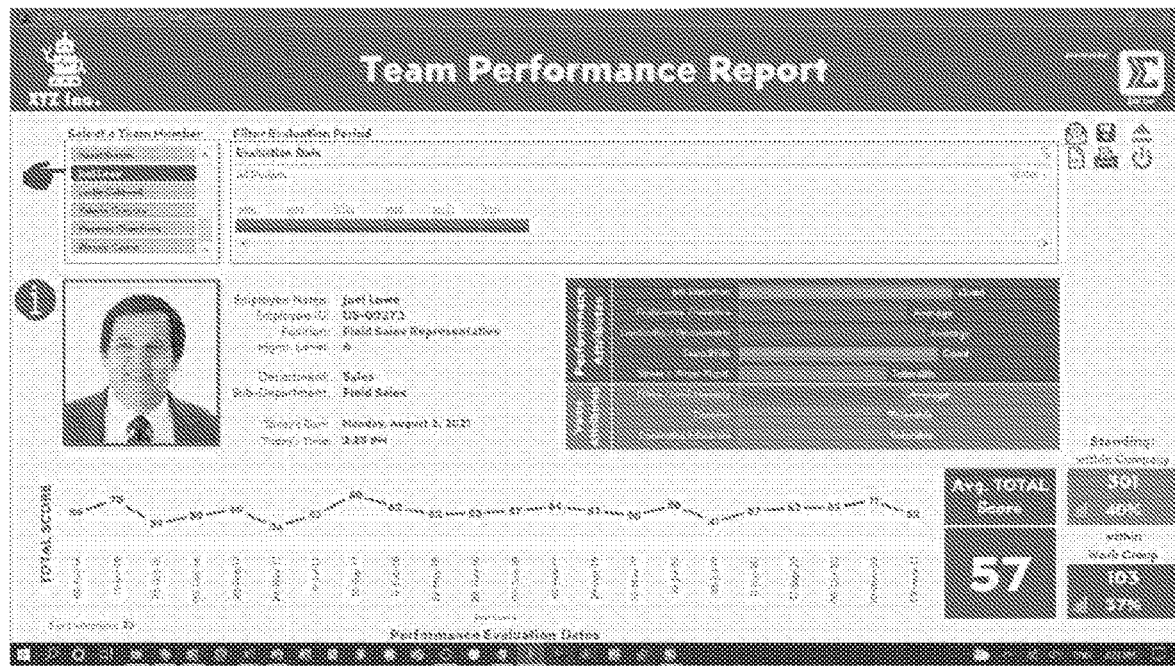
FIG. 36 is an Example of a Team Members Only Report with look-back

FIG. 36 shows an example of a Team Members Only Report with look-back. This report provides a manager with the ability to look at members of his workgroup only. The adjusted score, current attributes ratings (bar graph), company and workgroup standings, and look-back capability are reported. This example displays five years of evaluation history that consist of 22 evaluations.

Figure 37:
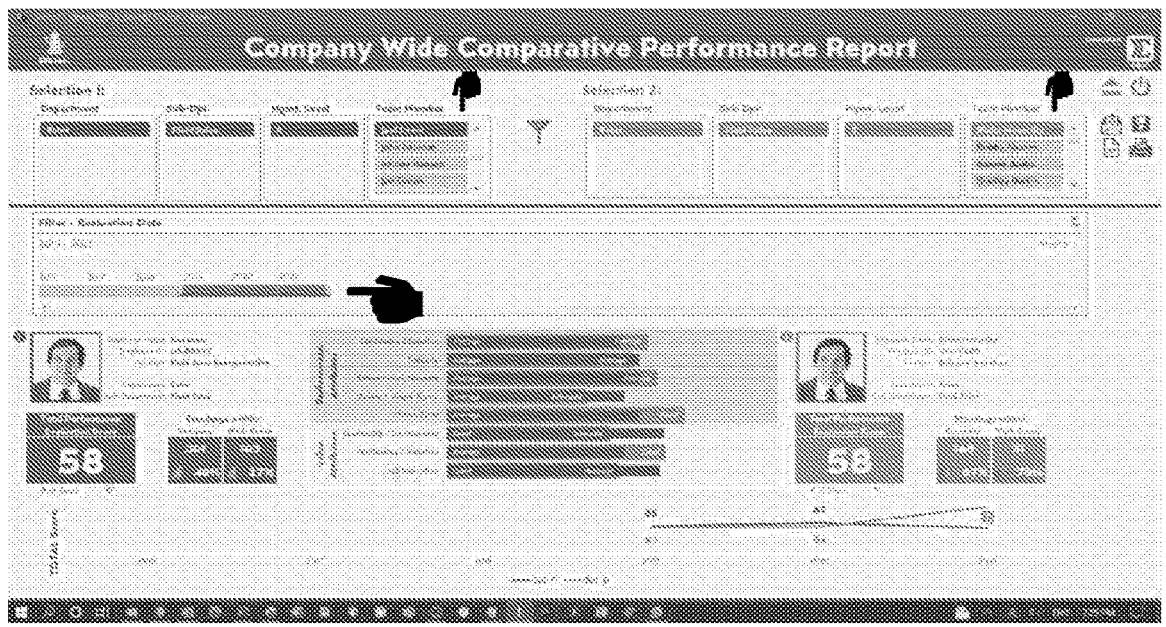
FIG. 37 is an Example of a Company-Wide Evaluatees Comparative Performance Report with look-back

FIG. 37 shows an example of a Company-Wide Evaluatees Comparative Performance Report with a look-back. This report provides comparative evaluation results of two individuals working in separate entities within an organization. It begins by choosing the department, subdepartment, management hierarchy level, and finally, any individual working in the named workgroup, then selecting the same for another individual of interest in another workgroup. The report includes scores, standings, an attribute bar graph, and a line chart. The bar graph superimposes the attributes rating results of both individuals of interest. At the bottom is a line chart that superimposes the scoring history of both individuals. This function also has look-back capability.

FIG. 38 shows an example report of the Top Five Performers. The Top Five Performers report begins with the choice of department, sub-department, and hierarchy management level. The system then chooses the appropriate individuals. The result identifies the Evaluatees, their name, ID, position, hierarchy level, department, and sub-department. Next, the number of evaluations, average score totals, trend (over time), average attributes performance (bar graphs), and standings. The report has look-back capability. Finally, the evaluatees are numerically rated—1 through 5.

Job Assignment Drift

Job Assignment Drift is essentially an Evaluator's opinion of an Evaluatee's current job position as opposed to their previous job assignment. Initially, this is a purely subjective issue on the part of the Evaluator but will move into a more logic-based automated process with the use of AI. With future funding, algorithms will be created to compare a current job description to a previous job description. Currently, there is a second side to the report, which is objective. The system compares the previous report's adjusted score to the present report's adjusted score.

Suppose the score comparison is within a reasonable variation tolerance. In that case, there is no action necessary by management, and management can assume the job assignment change was successful. But if the new assignment score is below an acceptable tolerance, a problem exists, and management action could be necessary. On the other hand, if the current score is an improvement, management has been informed of a positive result and potential, indicating a more valuable employee than was initially understood. Digital field theory will explain and properly translate correlations of evaluations for the employee, within their department, organization, and other analysis regarding performance and the position they were hired for.

Job Assignment Drift Calculation Example

Current Adjusted Score=CAS

Previous Adjusted Score=PAS

Difference between CAS and PAS=$\Delta$

If PAS$\geq$CAS=$-\Delta$ is negative The extent of negativity uses standard deviation approximation.

If PAS$\leq$CAS=$+\Delta$ is positive The extent of positivity uses standard deviation approximations.

If PAS=CAS=$+\Delta$ is neutral The extent of neutrality uses a deviation tolerance approximation.

FIG. 39 shows Drift Scores for this Job Assignment Drift Calculation Example.

Figure 40:
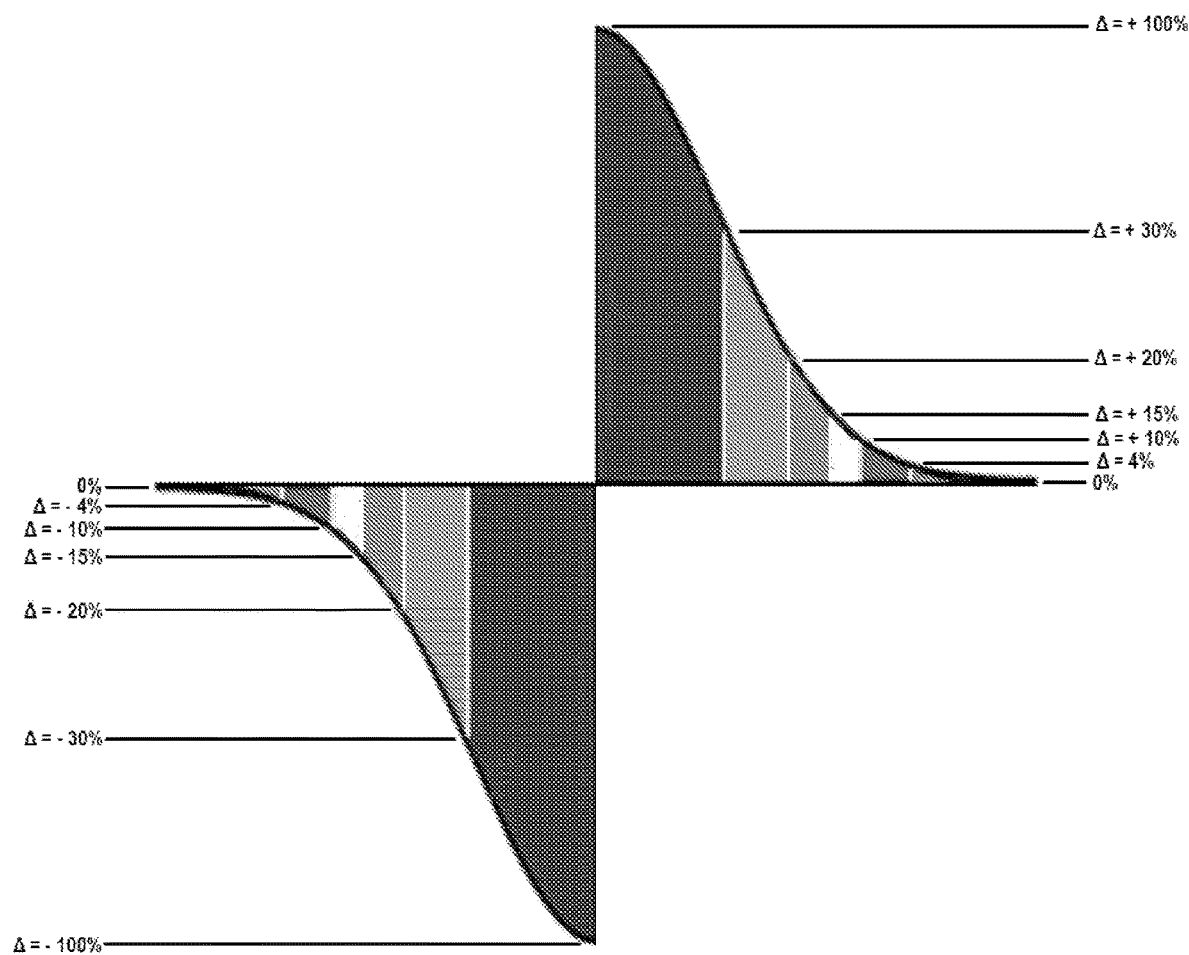
FIG. 40 is a Bell Curve

FIG. 40 shows a typical bell curve that can be used to set organization standards. In this example a $\Delta$ of +/−4% could be an acceptable neutrality standard. Perhaps a $\Delta$ of −10% could be a caution indication. A+$\Delta$ of 30% could be an indication of significant Evaluatee value and potential. Each organization can, if they prefer, can set its score deviation standards.

This detailed description, and particularly the specific details of the exemplary embodiment disclosed, is given primarily for clearness of understanding and no unnecessary limitations are to be understood therefrom, for modifications will become evident to those skilled in the art upon reading this disclosure and may be made without departing from the spirit or scope of the claimed invention. There are many data input and report variations possible with this system. The examples shown are current working versions of the existing prototypes.

Changes and modifications in the specifically-described embodiments may be carried out without departing from the principles of the present invention, which is intended to be limited only by the scope of the appended claims as interpreted according to the principles of patent law including the doctrine of equivalents.

We claim:

1. A method using a computing device having a graphical user interface (GUI) for evaluating and ranking personnel within an organization for performance and value, the organization including a plurality of hierarchy levels and one or more workgroups, the one or more workgroups being associated with one of the plurality of hierarchy levels and including an evaluator and one or more evaluatees, the method comprising:
    displaying, via the GUI of the computing device, an interactive electronic interface including a drop-down menu for selecting an evaluatee of the one or more evaluatees and an electronic evaluation table, the electronic evaluation table having a set of attributes each including a drop-down list having a grade selectable by the evaluator;
    in response to selecting, by the evaluator, the evaluatee from the drop-down menu, automatically populating, by the computing device, information describing the selected evaluatee on the interactive electronic interface;
    receiving, by the computing device, the grade selected by the evaluator from the drop-down list for each of the attributes of the selected evaluatee and displaying on the GUI the grade in the electronic evaluation table for each of the attributes of the evaluatee, each grade corresponding to a score;
    determining, by the computing device, a raw score of the electronic evaluation table for the selected evaluatee, the raw score being a total of the scores assigned by the evaluator to each of the attributes for the selected evaluatee;
    generating, by the computing device, a matrix having scores assigned by the evaluator to each of the attributes and for every evaluatee of the one or more evaluatees within a workgroup;
    establishing, by the computing device, a plurality of mean values for the matrix, each mean value is based on the scores of respective one of the attributes and a number of the one or more evaluatees within the workgroup;
    establishing, by the computing device, a plurality of median values for the matrix, each median value is based on the scores of respective one of the attributes and a number of the one or more evaluatees within the workgroup;
    generating, by the computing device, a mean curve based on the mean values for the matrix and a median curve based on the median values for the matrix;
    averaging, by the computing device, the mean and median curves to establish an evaluator curve for the evaluator of the workgroup, the evaluator curve determining a preference and a judgement style of the evaluator of the workgroup;
    determining, by the computing device, the evaluator curve for each evaluator of the one or more workgroups and using the evaluator curve to establish a hierarchy behavior curve for each hierarchy level associated with the one or more workgroups, the hierarchy behavior curve determining a preference and a judgement style of each hierarchy level of the organization;
    adjusting, by the computing device, the hierarchy behavior curve for each hierarchy level by averaging (a) the hierarchy behavior curve of a selected hierarchy level with and (b) the hierarchy behavior curve of one hierarchy level higher than the selected hierarchy level;
    determining, by the computing device, an adjustment factor for an evaluator of the selected hierarchy level by averaging (a) the evaluator curve of the evaluator of the selected hierarchy level and (b) the evaluator curve of an evaluator of one hierarchy level higher than the selected hierarchy level;
    applying, by the computing device, the adjustment factor to the raw score for each evaluatee to arrive at an adjusted score for each evaluatee to adjust an effect of the preference and judgement style of each evaluator; and
    selectively displaying, via the GUI of the computing device, an updated interactive electronic interface for each evaluatee within the one or more workgroups, the updated interactive electronic interface having grades for each of the attributes and the adjusted score for each evaluatee within the one or more workgroups.

2. The method according to claim 1, wherein the set of attributes comprises a plurality of performance attributes and a plurality of value attributes.

3. The method according to claim 2, wherein the plurality of performance attributes includes task execution, proficiency or initiative, leadership or decision-making, stress or anger management, and team skills.

4. The method according to claim 2, wherein the plurality of value attributes includes ethics or intellectual honesty, tenacity, and continuing education.

5. The method according to claim 2, wherein each of the plurality of performance attributes and value attributes are weighed symmetrically.

6. The method according to claim 2, wherein each of the plurality of performance attributes and value attributes are weighed asymmetrically.

7. The method according to claim 1, wherein each mean value used to generate the mean curve is determined by computing a cumulative score for respective one of the attributes and dividing the cumulative score by a number of evaluatees of the one or more evaluatees within the workgroup, and wherein each median value used to generate the median curve is determined by arranging in a sequence each score for respective one of the attributes and for every evaluatee and by determining a middle value in the sequence.

8. The method according to claim 1, wherein the step of using the evaluator curve for the evaluator to determine a hierarchy behavior curve for each hierarchy level associated with the workgroup further comprises the steps of:
    using the evaluator curve for the evaluator with the evaluator curve for another evaluator in a selected hierarchy level to determine a mean curve for the selected hierarchy level;
    using the evaluator curve for the evaluator with the evaluator curve for another evaluator in the selected hierarchy level to determine a median curve for the selected hierarchy level; and
    generating the hierarchy behavior curve for the selected hierarchy level by averaging the mean curve and the median curve for the selected hierarchy level.

9. The method according to claim 1, further comprising: assigning a job assignment drift score based on a comparison of a former evaluation score related to job change for a selected evaluatee to a current evaluation score related to job change of the selected evaluatee.

10. The method according to claim 1, further comprising: reviewing scores of another evaluatee of the one or more evaluatees evaluated by the evaluator to aid the evaluator in assigning attribute scores to each evaluatee.

11. A system for evaluating and ranking based on performance and value one or more evaluatees by an evaluator within an organization having one or more workgroups, the system comprising:

a memory having a non-transitory computer-readable program code stored thereon;

a graphical user interface (GUI);

a processor operatively coupled to the memory and the GUI within a distributive network, wherein the processor is configured to execute the computer-readable program code to:

display on the GUI an interactive electronic interface including a drop-down menu for selecting an evaluatee of the one or more evaluatees and an electronic evaluation table, the electronic evaluation table having a set of attributes each including a drop-down list having a grade selectable by the evaluator;

in response to selecting, by the evaluator, the evaluatee from the drop-down menu, automatically populate, by the processor, information describing the selected evaluatee on the interactive electronic interface;

receive, by the processor, the grade selected by the evaluator from the drop-down list for each of the attributes of the selected evaluatee and display on the GUI the grade in the electronic evaluation table for each of the attributes of the evaluatee, each grade corresponding to a score;

determine a raw score of the electronic evaluation table for the selected evaluatee, the raw score being a total of the scores assigned by the evaluator to each of the attributes for the selected evaluatee;

generate, by the processor, a matrix having scores assigned by the evaluator to each of the attributes and for every evaluatee of the one or more evaluatees within the workgroup;

establish, by the processor, a plurality of mean values for the matrix, each mean value is based on the scores of respective one of the attributes and a number of the one or more evaluatees within the workgroup;

establish, by the processor, a plurality of median values for the matrix, each median value is based on the scores of respective one of the attributes and a number of the one or more evaluatees within the workgroup;

generate, by the processor, a mean curve based on the mean values for the matrix and a median curve based on the median values for the matrix;

average, by the processor, the mean and median curves to establish an evaluator curve for the evaluator of the workgroup, the evaluator curve determining a preference and a judgement style of the evaluator of the workgroup;

determine, by the processor, the evaluator curve for each evaluator of the one or more workgroups and use the evaluator curve to establish a hierarchy behavior curve for each hierarchy level associated with the one or more workgroups, the hierarchy behavior curve determining a preference and a judgement style of each hierarchy level of the organization;

adjust, by the processor, the hierarchy behavior curve for each hierarchy level by averaging (a) the hierarchy behavior curve of a selected hierarchy level and (b) the hierarchy behavior curve of one hierarchy level higher than the selected hierarchy level;

determine, by the processor, an adjustment factor for an evaluator of the selected hierarchy level by averaging (a) the evaluator curve of an evaluator of the one hierarchy level higher and (b) the evaluator curve of the evaluator of the selected hierarchy level;

apply, by the processor, the adjustment factor to the raw score for each evaluatee to arrive at an adjusted score for each evaluatee to adjust an effect of the preference and judgement style of each evaluator; and selectively display on the GUI an updated interactive electronic interface for each evaluatee within the one or more workgroups, the updated interactive electronic interface having grades for each of the attributes and the adjusted score for each evaluatee within the one or more workgroups.

12. The system according to claim 11, wherein the attributes comprises a plurality of performance attributes and a plurality of value attributes.

13. The system according to claim 12, wherein the plurality of performance attributes includes a task execution, proficiency and initiative, leadership and decisionship, stress and anger management, and team skills, and wherein the plurality of value attributes includes ethics and intellectual honesty, tenacity, and continuing education.

14. The system according to claim 11, wherein the processor is configured to execute the computer-readable program code to assign a job assignment drift score based on a comparison of a former evaluation score related to job change for a selected evaluatee to a current evaluation score related to job change of the selected evaluatee.

15. The system according to claim 11, wherein the processor is configured to execute the computer-readable program code to review scores of another evaluatee of the one or more evaluatees within the one or more workgroups evaluated by the evaluator to aid the evaluator in assigning attribute scores to each evaluatee.

16. A computer-implemented method for evaluating and ranking personnel within an organization for performance and value, the organization including a plurality of hierarchy levels and one or more workgroups, the one or more workgroups being associated with one of the plurality of hierarchy levels and including an evaluator and one or more evaluatees, the method comprising:

displaying, via a GUI of a computing device, an interactive electronic interface including a drop-down menu for selecting an evaluatee of the one or more evaluatees and an electronic evaluation table, the electronic evaluation table having a set of attributes each including a drop-down list having a grade selectable by the evaluator;

in response to selecting, by the evaluator, the evaluatee from the drop-down menu, automatically populating, by the computing device, information describing the selected evaluatee on the interactive electronic interface;

receiving, by the computing device, the grade selected by the evaluator from the drop-down list for each of the attributes of the selected evaluatee and displaying on the GUI the grade in the electronic evaluation table for each of the attributes of the evaluatee, each grade corresponding to a score;

determining, by the computing device, a raw score of the electronic evaluation table for the selected evaluatee, the raw score being a total of the scores assigned by the evaluator to each of the attributes for the selected evaluatee;

generating, by the computing device, a matrix having scores assigned by the evaluator to each of the attributes and for every evaluatee of the one or more evaluatees within the workgroup;

assigning a job assignment drift score to every evaluatee of the one or more evaluatees in the matrix, the job assignment drift score for the selected evaluatee being based on a comparison of a former evaluation score for the selected evaluatee to the raw score of the selected evaluatee;

utilizing the scores from the matrix to generate an evaluator curve for the evaluator of the workgroup, the evaluator curve determining a preference and a judgement style of the evaluator of the workgroup;

using the evaluator curve for the evaluator of each of the one or more workgroups to determine, to determine by the computing device, a hierarchy behavior curve for each hierarchy level associated with the one or more workgroups, the hierarchy behavior curve determining a preference and a judgement style of each hierarchy level of the organization;

adjusting, by the computing device, the hierarchy behavior curve for each hierarchy level by averaging (a) the hierarchy behavior curve of a selected hierarchy level and (b) the hierarchy behavior curve of one hierarchy level higher the selected hierarchy level;

determining, by the computing device, an adjustment factor for an evaluator of the selected hierarchy level by averaging (a) the evaluator curve of the evaluator of the selected hierarchy level and (b) the evaluator curve of an evaluator of one hierarchy level higher than the selected hierarchy level;

applying, by the computing device, the adjustment factor to the raw score for each evaluatee to arrive at an adjusted score for each evaluatee to adjust an effect of the preference and judgement style of each evaluator; and selectively displaying, via the GUI of the computing device, an updated interactive electronic interface for each evaluatee within the one or more workgroups, the updated interactive electronic interface having grades for each of the attributes and the adjusted score for each evaluatee within the one or more workgroups.

* * * * *